United States Patent
Williams, Jr.

(10) Patent No.: US 6,202,211 B1
(45) Date of Patent: Mar. 13, 2001

(54) METHOD AND APPARATUS FOR PROVIDING TELEVISION SIGNALS TO MULTIPLE VIEWING SYSTEMS ON A NETWORK

(76) Inventor: Henry R. Williams, Jr., 11 Broadway, Third Fl., New York, NY (US) 10004

( * ) Notice: Subject to any disclaimer, the term of this patent is extended or adjusted under 35 U.S.C. 154(b) by 0 days.

(21) Appl. No.: 09/020,076

(22) Filed: Feb. 6, 1998

(51) Int. Cl.[7] .................................................. H04N 7/10
(52) U.S. Cl. .............................. 725/78; 725/80; 725/82; 725/120
(58) Field of Search .................................. 348/8, 12, 13; 709/219; 455/5.1, 6.3

(56) References Cited

U.S. PATENT DOCUMENTS

| | | |
|---|---|---|
| 4,513,315 | 4/1985 | Dekker et al. . |
| 4,761,642 | 8/1988 | Huntzinger . |
| 4,780,758 | 10/1988 | Lin et al. . |
| 4,866,515 * | 9/1989 | Tagawa ................................... 358/86 |
| 4,885,747 | 12/1989 | Foglia . |
| 4,891,633 | 1/1990 | Imazeki et al. . |
| 4,974,173 | 11/1990 | Stefik et al. . |
| 4,975,690 | 12/1990 | Torres . |
| 5,001,554 * | 3/1991 | Johnson et al. ........................ 358/86 |
| 5,121,478 | 6/1992 | Rao . |
| 5,272,700 | 12/1993 | Hansen et al. . |
| 5,274,836 | 12/1993 | Lux . |
| 5,351,234 | 9/1994 | Beierle et al. . |
| 5,365,264 | 11/1994 | Inoue et al. . |
| 5,469,219 | 11/1995 | Mortensen . |
| 5,485,221 | 1/1996 | Banker et al. . |
| 5,499,047 | 3/1996 | Terry et al. . |
| 5,539,477 | 7/1996 | Miyajima . |
| 5,565,910 | 10/1996 | Rowse et al. . |
| 5,586,121 | 12/1996 | Moura et al. . |
| 5,594,726 | 1/1997 | Thompson et al. . |
| 5,608,446 * | 3/1997 | Carr et al. ................................. 348/6 |
| 5,619,250 | 4/1997 | McClellan et al. . |
| 5,635,980 | 6/1997 | Lin et al. . |
| 5,652,627 | 7/1997 | Allen . |
| 5,668,997 | 9/1997 | Lynch-Freshner et al. . |
| 5,695,400 | 12/1997 | Fennell, Jr. et al. . |
| 5,708,961 * | 1/1998 | Hylton et al. ......................... 455/4.2 |
| 5,721,878 | 2/1998 | Ottesen et al. . |
| 5,722,041 | 2/1998 | Freadman . |
| 5,745,095 | 4/1998 | Parchem et al. . |
| 5,754,771 | 5/1998 | Epperson et al. . |
| 5,760,822 | 6/1998 | Coutinho . |
| 5,768,280 | 6/1998 | Way . |

(List continued on next page.)

OTHER PUBLICATIONS

"IEEE Recommended Practices for Broadband Local Area Networks, Oct. 19, 1989, pp. 13–85".*

(List continued on next page.)

Primary Examiner—Andrew Faile
Assistant Examiner—Hai V. Tran
(74) Attorney, Agent, or Firm—Blakely, Sokoloff, Taylor & Zafman, LLP

(57) ABSTRACT

A method and apparatus are provided for enabling multiple users to concurrently access a PC-based server in a home local area network using conventional TVs as display devices. A client system includes a TV, conventional input devices, such as a keyboard and a mouse, and a set top box for interfacing the TV to the network. The server maintains a system work area and multiple processes corresponding to user applications. The system work area is partitioned in the server into multiple independent, simultaneously active desktops, one desktop for each of the client systems. Individual processes are mapped to the appropriate desktop. Multiple frame buffers are maintained in the server, such that a different frame buffer is assigned to each client system. Each desktop is rendered within the server and stored in the corresponding frame buffer. The contents of each frame buffer are transmitted over a transmission medium to the set top box of the corresponding client system. Desktop display data is provided by the set top box to the corresponding TV for display to a user.

28 Claims, 27 Drawing Sheets

U.S. PATENT DOCUMENTS

| | | | |
|---|---|---|---|
| 5,781,227 | | 7/1998 | Goode et al. . |
| 5,805,804 | | 9/1998 | Laursen et al. . |
| 5,812,123 | | 9/1998 | Rowe et al. . |
| 5,819,273 | | 10/1998 | Vora et al. . |
| 5,825,829 | | 10/1998 | Borazjani et al. . |
| 5,850,340 | | 12/1998 | York . |
| 5,855,015 | | 12/1998 | Shoham . |
| 5,864,672 | | 1/1999 | Bodeep et al. . |
| 5,889,949 | | 3/1999 | Charles . |
| 5,896,179 | | 8/1999 | Eglit . |
| 5,912,676 | | 6/1999 | Malladi et al. . |
| 5,920,856 | | 7/1999 | Syeda-Mahmood . |
| 5,923,385 | | 7/1999 | Mills et al. . |
| 5,926,207 | | 7/1999 | Vaughan et al. . |
| 5,929,850 | | 7/1999 | Broadwin et al. . |
| 5,936,660 | * | 8/1999 | Gurantz ................................. 348/10 |
| 5,953,044 | | 9/1999 | Kato et al. . |
| 5,953,348 | | 9/1999 | Barn . |
| 5,960,445 | * | 9/1999 | Tamori et al. ....................... 707/203 |
| 5,974,441 | | 10/1999 | Rogers et al. . |
| 5,982,363 | | 11/1999 | Naiff . |
| 5,983,200 | | 11/1999 | Slotznick . |
| 5,983,218 | | 11/1999 | Syeda-Mahood . |
| 6,009,422 | | 12/1999 | Ciccarelli . |
| 6,009,465 | * | 12/1999 | Decker et al. ....................... 709/219 |
| 6,018,343 | | 6/2000 | Wang et al. . |
| 6,029,165 | | 2/2000 | Gable . |
| 6,052,819 | | 4/2000 | Barker et al. . |

OTHER PUBLICATIONS

"The Hybrid Home Entertainmemt System", Altec Lansing Technologies, Inc., Obtained at Comdex (Las Vegas) on Nov. 1997, 8 pages.

"ICA Positioning Paper", Citrix Systems, Inc., reference dated Mar. 16, 1996, downloaded from http://www.citrix.com/technology/icapos.htm on Dec. 15, 1997, 6 pages.

"Enjoy the Internet, PC Games and More, All on Your TV", Wireless PC @TV, downloaded from http://www.rflinktech.com/pctv.htm on Dec. 15, 1997, 5 pages.

"ICA Technical Paper", Citrix Systems, Inc., reference dated Mar. 16, 1996, downloaded from http://www.citrix.com/technology/icatech.htm on Dec. 15, 1997, 8 pages.

*IEEE Recommended Practices for Broadband Local Area Networks*, Oct. 19, 1989, pp. 13–85.

Ronald S. Foster, "CATV Systems Are Evolving to Support a Wide Range of Services", *Telecommunications*, Horizon House Publications, Inc., Jan. 1994, v. 28, n. 1, p. 95(3), 5 pages.

Abstract, "Expansion: Cable's 70 mhz Solution," *Broadcasting & Cable*, vol. 124, Issue 21, May 23, 1994, p. 80–83, 2 pages.

Thin–Client/Server Computing, ICA Positioning Paper, Citrix, http://www.citrix.com/technology/icapos.htm, Mar. 16, 1996, 6 pages.

Sameer Madan, "Search the Web without a headache", SearchPad Indian Review in PC World (India), Feb. 1998, pp. 40–41.

Anselm Lingnau, et al., "An HTTP–based Infrastructure for Mobile Agents", http://www.w3.org/Conferences/WW4/Papers/150/, Jul., 1995, 15 pages.

Patricia Smith, "WebCompass Takes Web Searching in the Right Direction", Seybold Report on Desktop Publishing, vol. 10, No. 10, 1996, 9 pages.

Csaba J. Egyhazy, et al., "Intelligent Web Search Agents", downloaded from http://csgrad.cs.vt.edu/~tplunket/article.html on Dec. 20, 1999, 23 pages.

"Intermind Announces Approval of First Patent Application", Oct. 7, 1997, Seattle, WA, http://www.intermind.com/inside/press_rel/100797_allow.html., 3 pages.

"About Intermind's Channel Communications Patents", downloaded from http://www.intermind.com/materials/patent_desc.html on Feb. 27, 1998, 5 pages.

"Frequently Aseded Questions about Intermind's Patents", downloaded from http://www.intermind.com/materials/patent_faq.html on Feb. 27, 1998, 9 pages.

* cited by examiner

METHOD AND APPARATUS FOR PROVIDING TELEVISION SIGNALS TO MULTIPLE VIEWING SYSTEMS ON A NETWORK

FIELD OF THE INVENTION

The present invention pertains to the field of client-server computer networking. More particularly, the present invention relates to techniques for providing television signals to multiple viewing systems connected on a network.

BACKGROUND OF THE INVENTION

In many countries, the number of households which own a personal computer (PC) is increasing rapidly. For many reasons, the use of PCs has been limited in many homes to playing games and word processing. The reasons may include limitations of the PC in processing power, storage capacity, and bandwidth. Further, many people are uncomfortable using complex technology and avoid using computers altogether. In addition, PCs tend to be physically suited for a desk and not for a family room or bedroom. PC electronics tend to be designed to interface with office systems and not with home communication systems, and there is generally no convenient mechanism for purchasing, loading, storing and organizing traditional entertainment content using a home PC. It is desirable, therefore, to allow conventional PCs to be used in a home environment for more applications than in the past, more easily, and by a greater number of people.

Because the home is commonly a place to relax and enjoy oneself, televisions (TVs) and stereo systems tend to be focal points at home, since these devices are entertainment oriented. Even most technophobes are comfortable operating a TV or stereo system. Consequently, by allowing televisions, stereos, and other consumer devices to be more seamlessly connected with conventional PCs, the PC can become a more integral part of activities in the home. Technologies have been developed which enable a TV to be used as a display device for a personal computer. However, these technologies are not designed to allow multiple users at multiple TVs to use a PC independently of each other. Other technologies have been developed to allow people to access the Internet using a conventional TV as a display device. However, such technologies do not leverage the tremendous technology base that already exists in software and hardware for PC platforms.

Thus, it is desirable to provide a technology which allows the processing power of a conventional PC to be integrated seamlessly with a TV as a display device in the home environment. It is further desirable to allow multiple home users to independently use a PC operating as a server using TVs as display devices. It is further desirable to have such a technology which can make use of communications infrastructure already in the home.

SUMMARY OF THE INVENTION

The present invention includes a device for providing television signals to a plurality of viewing systems on a network. The device includes a connection for receiving television channels from outside the network and a number of tuners for demodulating television channels. A different tuner is assigned to each of the viewing systems. The device further includes a number of modulators for modulating television channels and control circuitry configured to receive a request for one of the television channels. The request is associated with one of the viewing systems. The control circuitry is configured to respond to the request by causing the tuner assigned to the viewing system associated with the request to demodulate the requested television channel and by causing one of the modulators to remodulate the demodulated television channel onto the network. Other features of the present invention will be apparent from the accompanying drawings and from the detailed description which follows.

DETAILED DESCRIPTION

A technique is described for controlling television signal distribution to multiple client systems in a home network. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram or other symbolic form in order to facilitate description of the present invention.

I. Overview

As will be described in detail below, the present invention includes techniques which allow multiple users in a home environment to independently use a PC operating as a server using conventional TVs as display devices. These techniques include the use of existing communications infrastructure in the home. The present invention also includes techniques which allow a user to control television viewing within the home network from a central location. One advantage of these techniques is that parents can more easily control the television material viewed by their children in the home.

Briefly, each TV is connected to a set top box, which provides a connection to the server PC and performs various routing functions. The server maintains multiple, simultaneously active desktops (user work areas provided by a graphical user interface), i.e., one desktop for each client. For purposes of this description, the terms "client" or "client system" may refer to a set top box of the present invention, the set top box alone or in combination with its corresponding TV and/or other associated devices. Each desktop is rendered into a separate, dedicated frame buffer in the server PC. The video data in each frame buffer are then transmitted to the corresponding set top box, which then provides display data to its owning TV for display as a desktop. Each set top box/TV combination represents a very "thin" client, since virtually all processing functions remain in the server.

Figure 1:
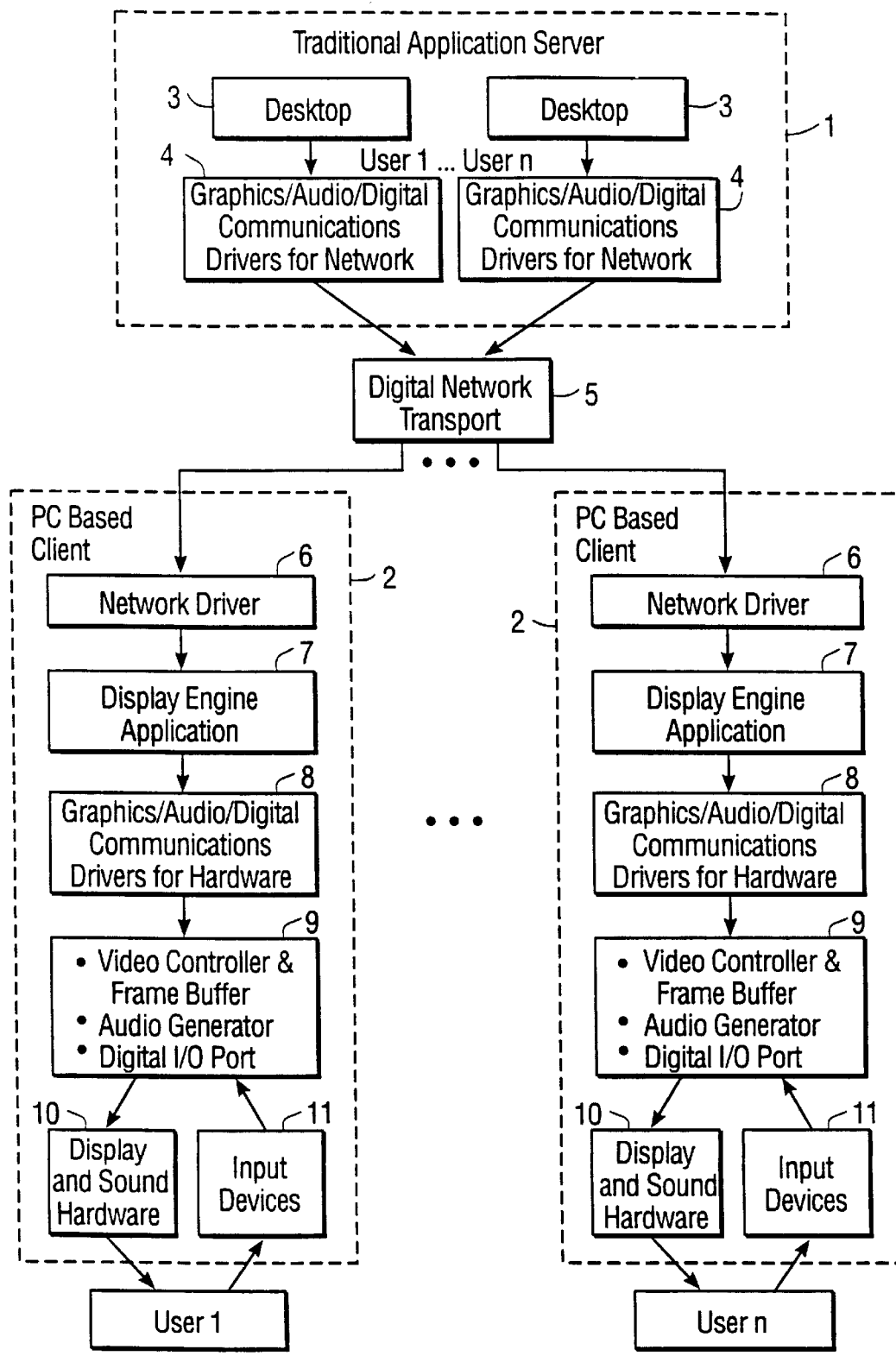
FIG. 1 illustrates a server connected to multiple clients in a network according to the prior art.

FIG. 1 illustrates a local area network (LAN) according to the prior art. Note that for purposes of this description, the terms "local area network", "local network" and "LAN" refer to a network that is confined to a relatively small geographic area, such as within a building; hence, these terms do not connote any particular physical network configuration or type of communications protocol. The network of FIG. 1 includes a conventional, PC-based application server 1, which is connected through a digital network transport 5 to n PC-based clients 2. The network transport 5 may be based on, for example, an Ethernet system and may include any conventional network transmission medium, such as standard telephone wire. The server 1 maintains n desktops 3, one for each of the n users. The server 1 may further maintain and execute one or more processes (not shown) for each of the n desktops 3. The server 1 also maintains a set of drivers 4 for each of the desktops 3 for purposes of communication of graphical, audio, and/or digital data.

Each of the PC-based clients 2 includes a network driver 6, which receives data from the network transport 5. The network driver 6 provides output to a display engine application 7, which may be any software application capable of generating a visual display for a user. The output of the application 7 is provided to various graphics, audio and/or digital communications drivers 8, which communicate with a video controller/frame buffer, an audio generator, and a digital input/output (I/O) port of the client 2, which are collectively represented in FIG. 1 as block 9. Video data for generating displays are rendered within the client 2 by the video controller into the frame buffer. Audio and video data are then provided to the display and sound hardware 10 for output to the user.

For the reasons noted above, the network of FIG. 1 is not well suited for use in the home, in contrast with a network of the present invention. The present invention leverages existing hardware and software within the PC in order to reduce costs associated with the additional hardware that integrates the TV into the system, e.g., the set top box. Accordingly, rendering hardware and software within a server PC is used to generate visual displays, so that no such hardware or software is needed within the set top box.

Figure 2:
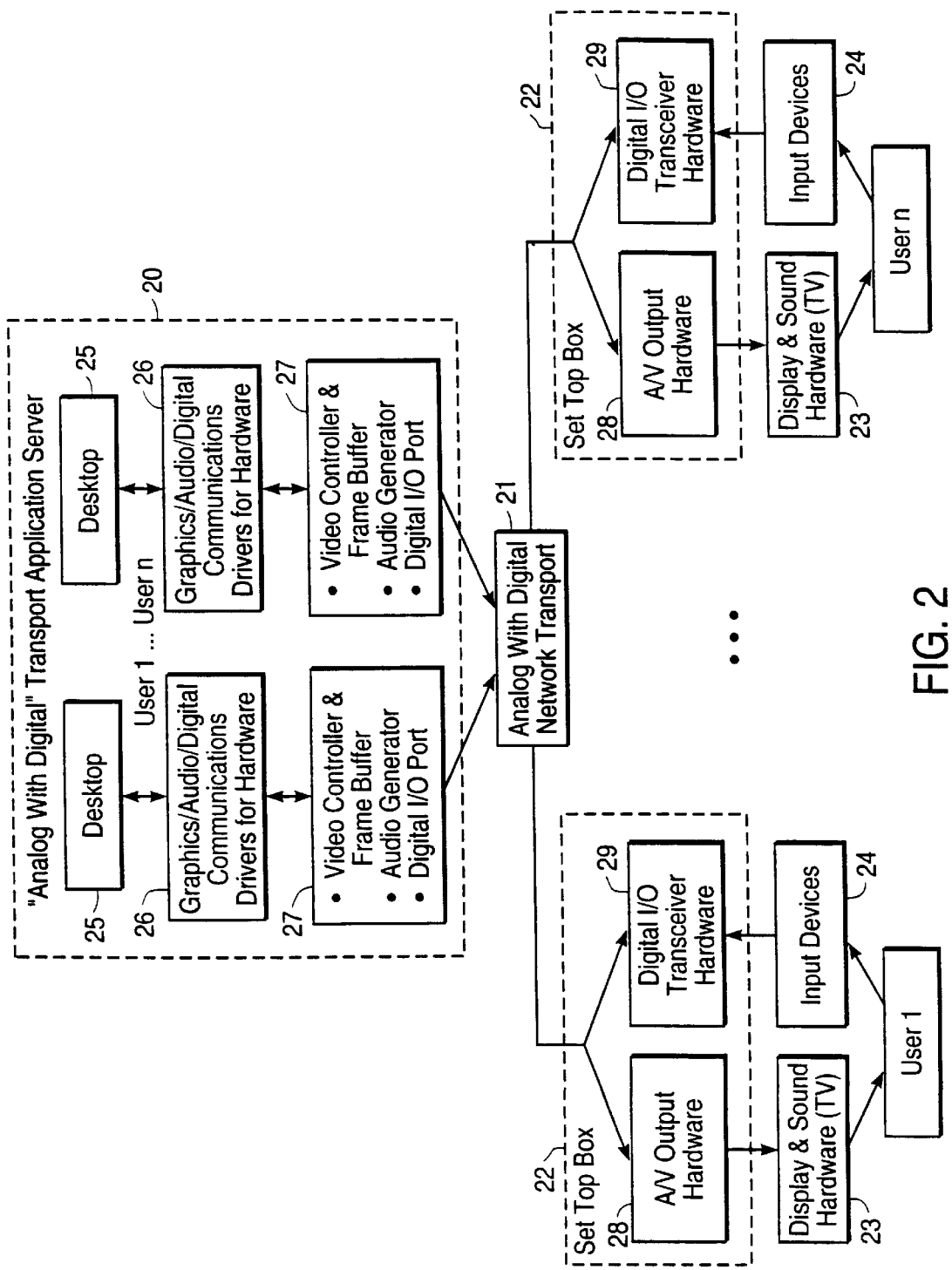
FIG. 2 illustrates a server connected to multiple TV-based clients in a home network according to the present invention.

FIG. 2 illustrates a local area network configuration in accordance with the present invention. The network includes a PC-based server 20. The server 20 is coupled to n set top boxes 22 associated with n TVs 23 and, therefore, n potential users. Each set top box is used to interface one of the TVs 23 to the network. The server 20 maintains n independent, concurrently active desktops 25, i.e., one desktop for each user. Each desktop 25 has its own cursor or insertion point and has a facility for launching applications. A desktop 25 functions independently from applications not associated with that desktop and independently from other desktops. For each client system, the server 20 also includes a separate video controller/frame buffer, audio generator, and digital I/O port 27 and a corresponding set of graphics, audio, and digital communications drivers 26. Thus, each desktop 25 is rendered within the server 20 and stored in its own dedicated frame buffer. The desktop is then transmitted to the corresponding set top box 22 via a network transport 21.

The server 20 is a conventional PC, except as specified otherwise in this description. Briefly, the server 20 has standard PC hardware as well as additional hardware according to the present invention. The server 20 runs a conventional operating system, such as Microsoft Windows 95 or Windows 98, and also executes additional software according to the present invention, which runs "on top of" the operating system. The additional hardware and software are described below.

The network transport 21 carries the rendered data for each particular frame buffer, as well as user inputs from a client system and status and control information, between the server 20 and the set top box 22. The network transport 21 may include point-to-point connections between the server 20 and each set top box 22, i.e., a one-to-one configuration. Alternatively, the network transport 21 may include a bus topology, i.e., and a one-to-many configuration. The details of each of these embodiments will be discussed further below. It will be recognized that other network configurations are possible within the scope of the present invention.

Each set top box 22 includes audio/video (A/V) output hardware 28 and digital I/O transceiver hardware 29. A TV is coupled to receive an NTSC, PAL, or other suitable signal from the A/V output hardware 28 in the set top box 22. In addition to a TV 23, one or more input devices 24 are also coupled to each set top box 22. The input devices 24 may include, for example, a keyboard and a pointing device.

Thus, the present invention provides that a separate desktop is maintained within the server 20 for each user, and each desktop is rendered into its own frame buffer within the server 20. The contents of each frame buffer are then provided to the appropriate set top box 22, which enables the corresponding desktop to be displayed on the connected TV 23.

Figure 3:
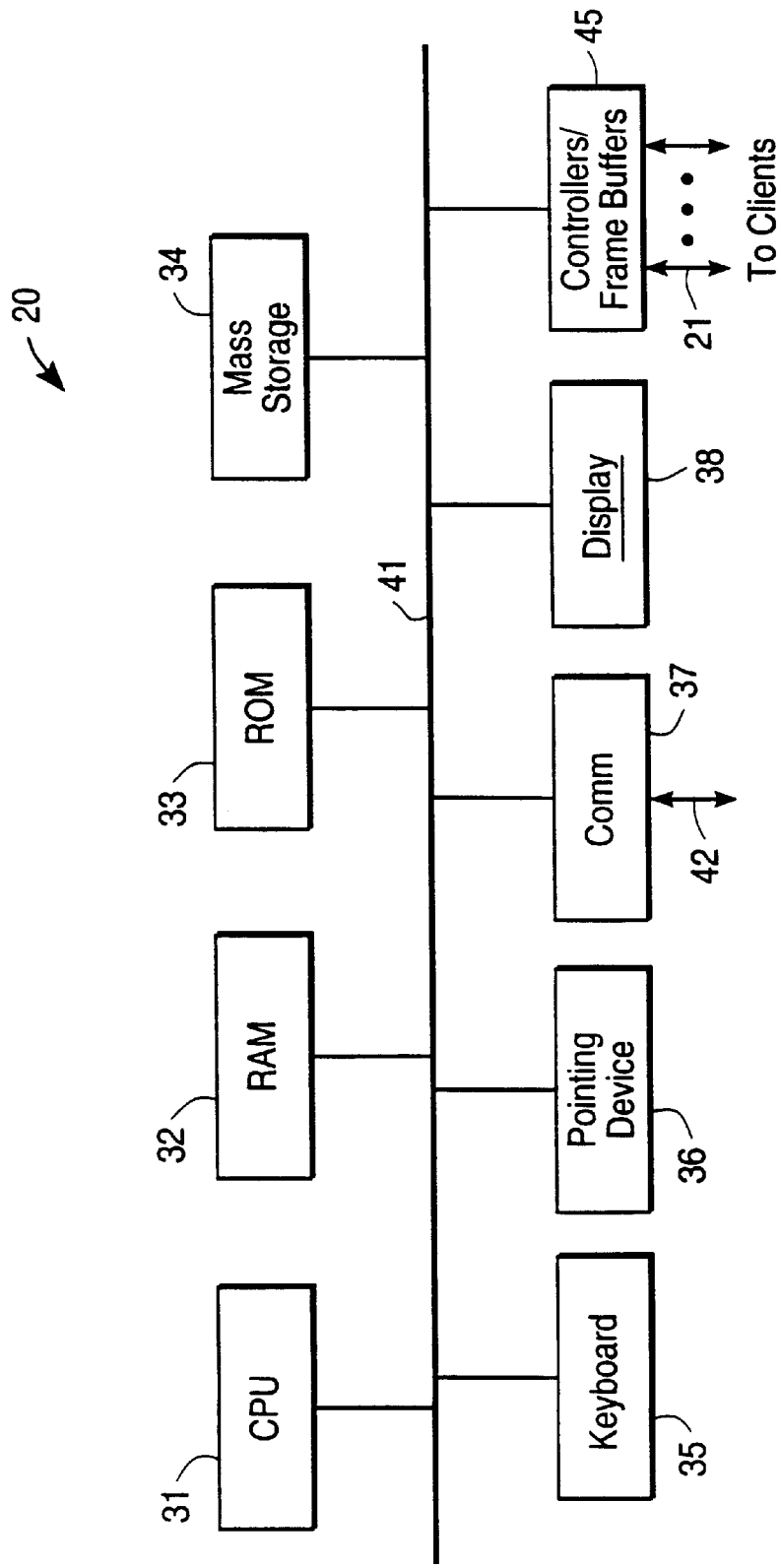
FIG. 3 is a block diagram of a personal computer (PC).

FIG. 3 illustrates a block diagram of the components of the server 20. Note that FIG. 3 is intended to be conceptual in nature and not to represent the details of the physical connections between components. Such details are well-known to those skilled in the art and are therefore not set forth herein. Moreover, the system of FIG. 3 may be varied and modified within the scope of the present invention, such as by adding, omitting, or replacing components. The server 20 includes a central processing unit (CPU) 31, random access memory (RAM) 32, read-only memory (ROM) 33, each connected to a bus system 41. The bus system 41 may include one or more buses connected to each other through various bridges, controllers and/or adapters, such as are well-known in the art. For example, the bus system may include a system bus, which may be connected through an adapter to one or more expansion buses, such as a Peripheral Component Interconnect (PCI) bus. Also coupled to the bus system 41 are a mass storage device 34, a keyboard 35, a pointing device 36, a communication device 37, and a display device 38.

The pointing device 36 may be any suitable device for enabling a user to position a cursor or pointer on the display device 38, such as a mouse, trackball, touchpad, or the like. The display device 38 may be any suitable device for displaying alphanumeric, graphical and/or video data to a user, such as a Cathode Ray Tube (CRT), Liquid Crystal Display (LCD), or the like. Mass storage device 34 may include any suitable device for storing large volumes of data, such as a magnetic disk or tape, magneto-optical (MO) storage device, or any of various types of Digital Versatile Disk (DVD) or compact disk (CD) storage. The communication device 37 may be any device suitable for or enabling the server 20 to communicate data with a remote computer system or network (outside the local network) over a communication link 42, such as a conventional telephone modem, a cable television modem, an Integrated Services Digital Network (ISDN) adapter, a Digital Subscriber Line (xDSL) adapter, or the like.

In accordance with the present invention, the server 20 also includes at least one add-in card 45 coupled to the bus system 41, which includes the video controllers and frame buffers for each of the clients. The card 45 may be coupled, for example, to a PCI bus or other similar expansion bus of the server 20. The card 45 also includes circuitry and components for implementing aspects of the network transport 21, including connectors, line drivers, etc. The components of the card 45 are discussed further below.

Note that in alternative embodiments, the controllers, frame buffers, and other components of card 45 may be included on the motherboard (not shown) of the server 20, rather than on a separate add-in card. Alternatively, the components of card 45 (and/or other components of the server 20) may be implemented within a separate housing from the other components of server 20.

Figure 4:
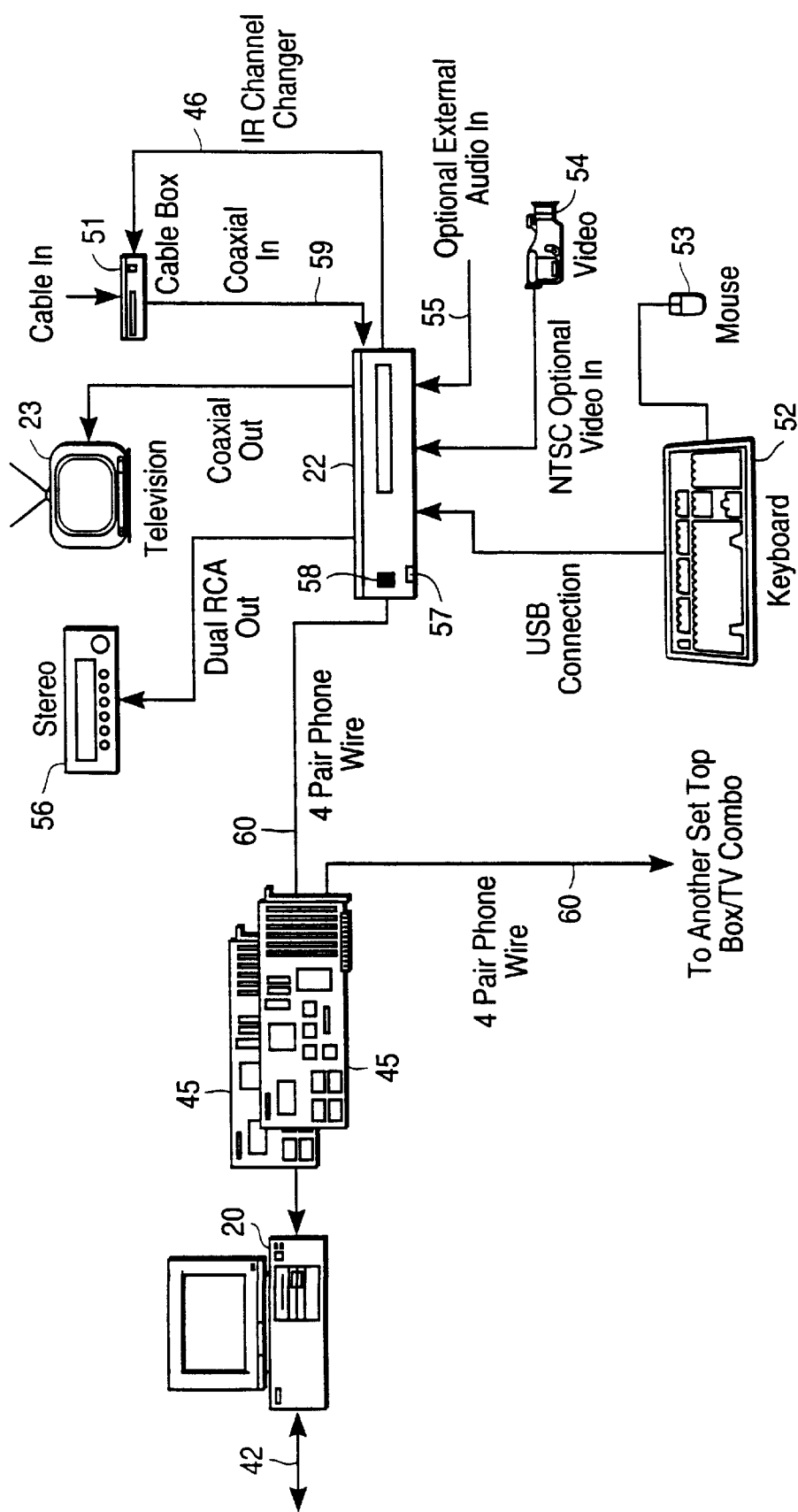
FIG. 4 is a diagram of a network of the present invention having a one-to-one topology.

FIG. 4 illustrates a network according to the present invention for an embodiment that employs a point-to-point connection between each set top box 22 and the server 20. The server 20 includes one or more add-in cards 45, each of which can accommodate two set top box/TV pairs in the illustrated embodiment. Note that in other embodiments, however, a given add-in card 45 may be designed to accommodate a different number of set top box/TV pairs. Each set top box 22 is coupled to the corresponding card 45 in the server 20 through an ordinary four-pair telephone wire 60 terminated at each end with a standard RJ-45 connector. Each set top box 22 is connected to its corresponding TV 23 by coaxial cable. As noted above, the server may have a data communication link 42 with a remote computer system or network. Two of the pairs of each telephone wire 60 are used as a digital channel for communication between the server 20 and a given set top box 22 of digital data, excluding video display data. The digital data includes user inputs transmitted from the box 22 to the server 20 and control and status information transmitted bi-directionally between the server 20 and the set top box 22. The digital channel may be implemented using conventional LAN communication techniques and protocols, such as those associated with Ethernet and other similar networks.

The set top box 22 receives inputs from a keyboard 52 and a mouse 53. In the illustrated embodiment, these components are connected to the set top box 22 using a Universal Serial Bus (USB) connection. However, other connection techniques might be used, such as an Institute of Electrical and Electronics Engineers (IEEE) 1394 bus. Alternatively, the keyboard 52 and/or mouse 53 may have a wireless link to the set top box 22, such as an infrared (IR) or radio frequency (RF) link. The set top box 22 also has an optional input for receiving video directly from a video camera 54 in a format such as NTSC, PAL, or any other conventional format. The set top box 22 further includes a built-in microphone 57 for direct input of audio and an optional input 55, which may be used to connect an external microphone to the set top box 22. Audio and video input to the set top box 22 may be transmitted to the server 20 via the wire 60, where it can be stored or processed as desired.

The set top box 52 has an IR, RF, or other suitable type of detector 58 for receiving user inputs from a handheld remote control device (not shown). The remote control device is used to control various functions of the set top box 22, such as selection of menu functions, etc.

The set top box 22 also has a coaxial cable input 59 for receiving signals from a cable TV converter box 51, which receives standard cable TV signals as input and outputs a tuned TV signal to the set top box 22 on channel 3 or 4. If the appropriate mode is selected, the set top box 22 provides the tuned TV signal to TV 23, such that a user can view standard television programming on the TV 23. In the illustrated embodiment, the channel setting of the cable box 51 is controlled by the set-top box 22 using IR link 46. The cable box 51 may also be controlled by a handheld IR, RF or other similar remote control device, which may be the same device used to control the set top box 22.

The set top box 22 includes an optional dual RCA audio output, which may be connected to a conventional stereo tuner/amplifier 56. Accordingly, audio data received from the server 20 or from a TV signal may be output to the stereo 56.

Figure 5:
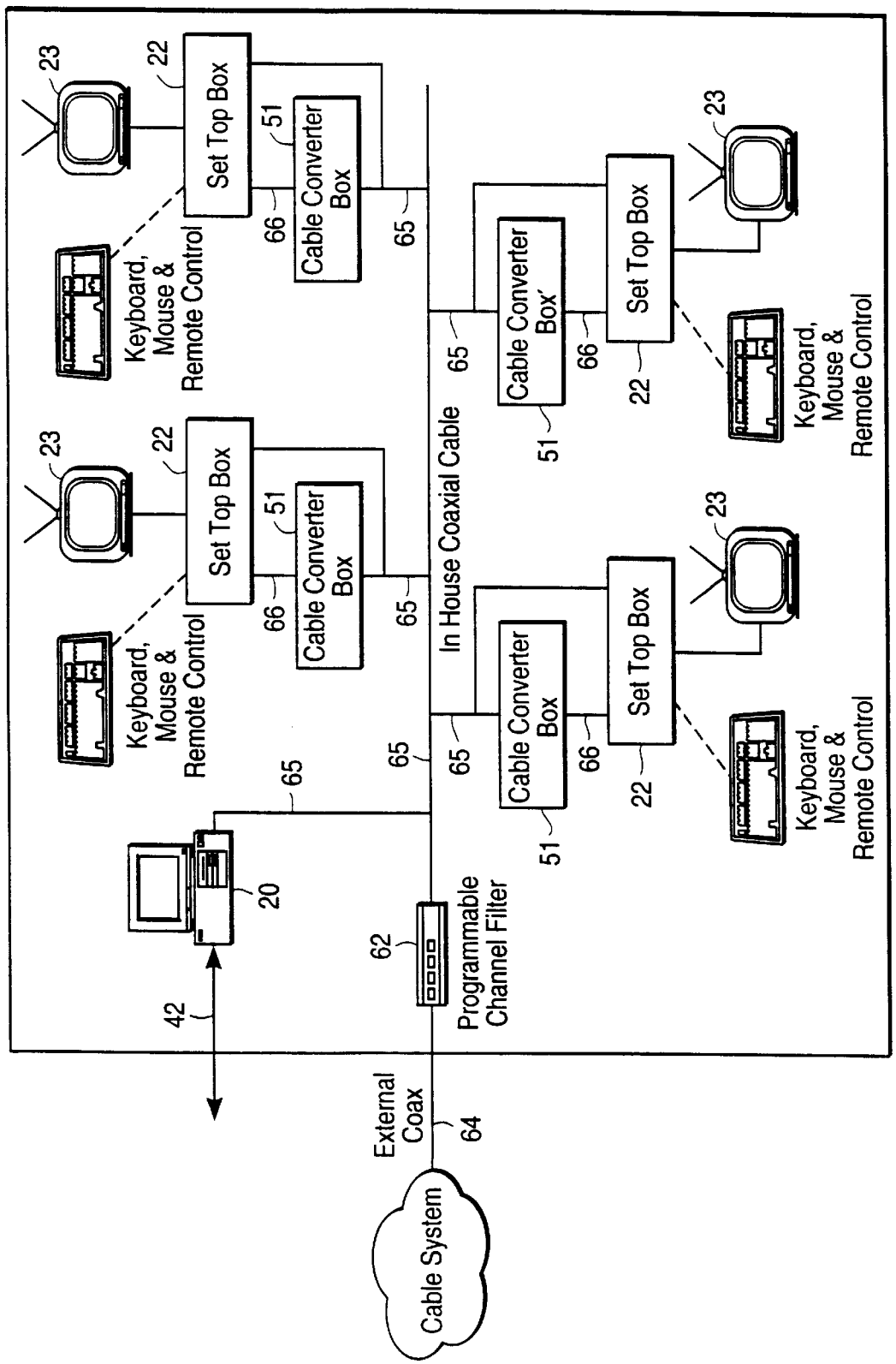
FIG. 5 is a diagram of a network of the present invention which uses a bus topology.

FIG. 5 illustrates a network according to another embodiment of the present invention, which uses a coaxial cable based bus topology. An advantage of such an embodiment is that it can incorporate existing coaxial cable infrastructure within the home, such as the cabling provided for cable TV. In FIG. 5, the server 20 and each set top box 22 are connected to a coaxial cable bus 65. Also coupled to the coaxial bus 25 are cable converter boxes 51, each of which has an input connected to the coaxial bus 65. In the illustrated embodiment, one cable converter bus 51 is associated with each set top box/TV pair. Each set top box 22 is coupled (bi-directionally) directly to the coaxial bus 65 and coupled (uni-directionally) to receive an input 66 directly from the corresponding cable converter box 51. Various I/O devices may be connected to each set top box 22, including a keyboard, mouse, etc., as described with reference to FIG. 4. Also coupled to the coaxial bus 65 is an output of a programmable channel filter 62, which has an external coaxial input 64 for receiving a cable television signal from outside the home (i.e., from the cable head end).

In the embodiment of FIG. 5, each client system is assigned its own RF (video) channel; standard 6 MHz wide television channels that have been filtered of other content can be used. For each client, video display data associated with a client (e.g., desktop data) is modulated onto the appropriate video channel by the server 20 and transmitted onto the bus 65. The display data is received by the set top box 22, demodulated, and provided to its connected TV 23 for display. User inputs and control and status information are communicated on the bus 65 using a separate video channel, designated as the "network channel", which is shared by all of the client systems.

The video channels assigned to the individual client systems and the network channel can be standard cable TV channels, the content of which has been removed by the programmable channel filter 62. Thus, the programmable channel filter 62 transmits all cable TV signals input to the home onto the coaxial cable bus 65 except those on the designated network channel and channels assigned to the client systems. The channel filter 62 also prevents signals generated locally within the network from leaving the network. The channel filter 62 may be manually programmable (e.g., using manual switches), or it may be programmable from the server 20 via bus 65 (facilitated by appropriate application software running on the server 20). Consequently, a user can control which cable TV channels are to be filtered for private use within the network. For example, it may be desirable to filter those channels which family members have the least interest in watching.

Each cable converter box 51 receives video signals from the bus 65 and outputs a cable TV signal to its corresponding set top box 22 on channel 3 or 4 according to the channel to which the converter box 51 is tuned. If the set top box 22 is set by the user to the appropriate mode, the cable TV signal is then provided to TV 23. If the set top box 22 is set to a mode in which the user can access the server 20, then the set top box 22 demodulates the video data received from the bus 65 according to its assigned channel and displays that information on the TV 23. The manner in which channels are assigned to client system and other aspects of this bus-based embodiment are further below.

II. Server

The above described features of the present invention are enabled, in part, by software which executes on the server 20. This software shall be referred to herein as the Multiple Client Management Software (MCMS), the functions of which are described below. These functions are described herein as being "performed by" the MCMS; however, it will be understood that it is actually the execution by a processor of the code representing the MCMS which causes these functions to occur. It should also be noted that in other embodiments, many functions of the MCMS can be provided in hardware or in a combination of hardware and software.

Figure 6:
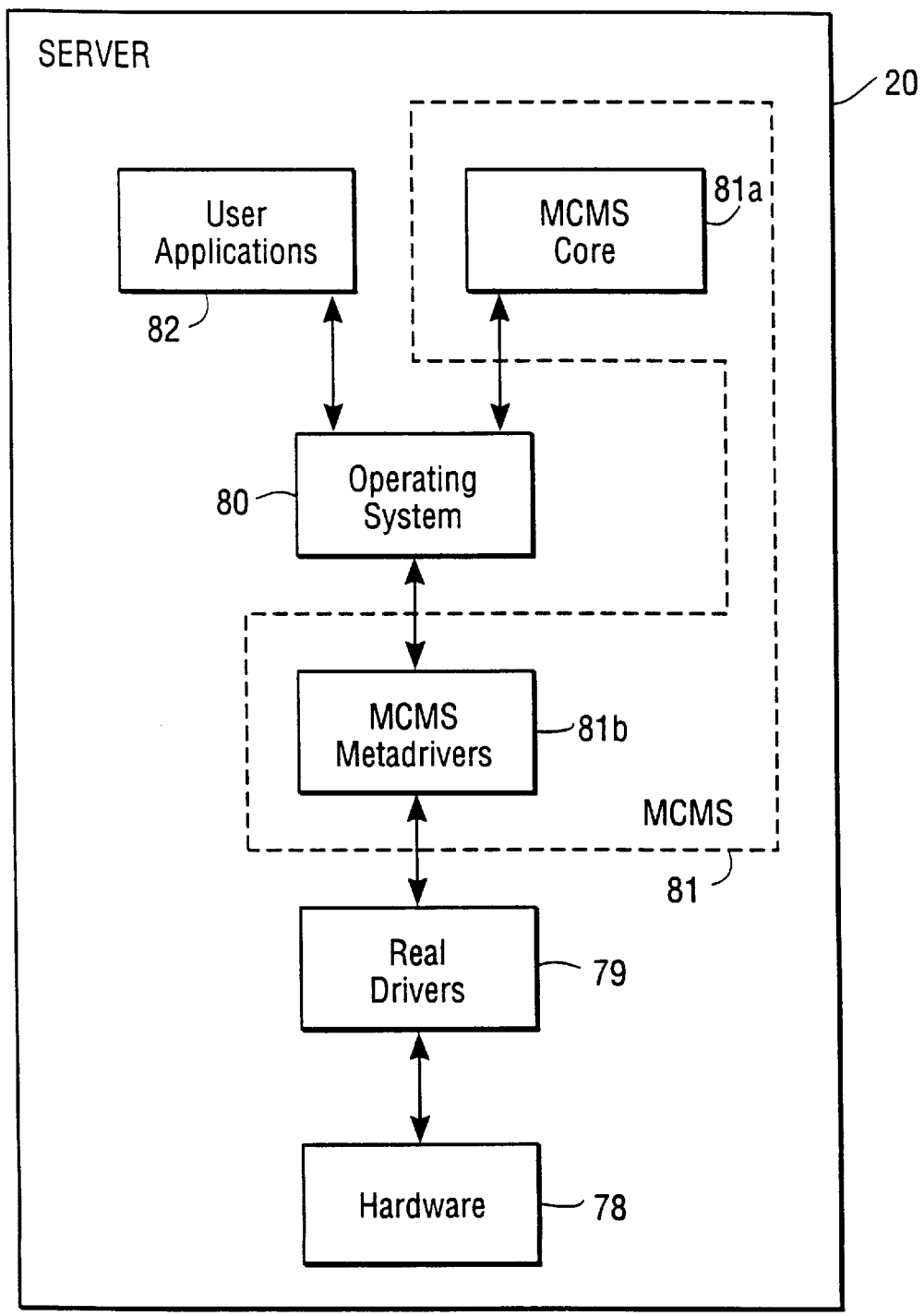
FIG. 6 is a block diagram illustrating a relationship between multiple client management software (MCMS) and standard components within a PC-based server.

FIG. 6 illustrates the relationship between the MCMS and the hardware 78 and operating system 80 of the server 20. The MCMS 81 includes a core component 81a, which functions as application software and operates "on top of" the operating system 80, as shown. The MCMS 81 also includes a metadriver component 81b, which includes one or more "metadrivers" that operate between the hardware 78 and the operating system 80 (or, more specifically, between the operating system 80 and the hardware drivers 79). The functions of the MCMS components are described in detail below. Note that in other embodiments, some or all of the functions of the MCMS 81 may be embedded within the operating system.

The operating system 80 operates on top of the hardware 78 of the server 20. The operating system 80 is a conventional operating system, such as Microsoft Windows 95 or Windows 98, as mentioned above. Hardware 78 collectively represents components such as shown in FIG. 3. Note that the MCMS 81 is separate from, and executes independently of and transparent to, any user applications 82 executing on the server 20. The MCMS operates in parallel with such user applications.

Generally, the MCMS 81 creates multiple desktops, one desktop for each client system. The MCMS core 81 maps each process executing on the server 20 to the correct desktop, and maps each desktop to the correct user interface (UI) channel. A UI channel is defined herein as a local collection of I/O facilities that completely represent the elements necessary to provide I/O for a given user. The facilities include a video controller that contains a frame buffer, an audio generator, and a communications I/O port for input device activity. These facilities are attached to the local bus within the server 20 and do not function as I/O facilities via a network to a remote processor. In addition, the MCMS 81 receives user inputs from individual client systems and maps those inputs to the correct desktop.

Figure 7:
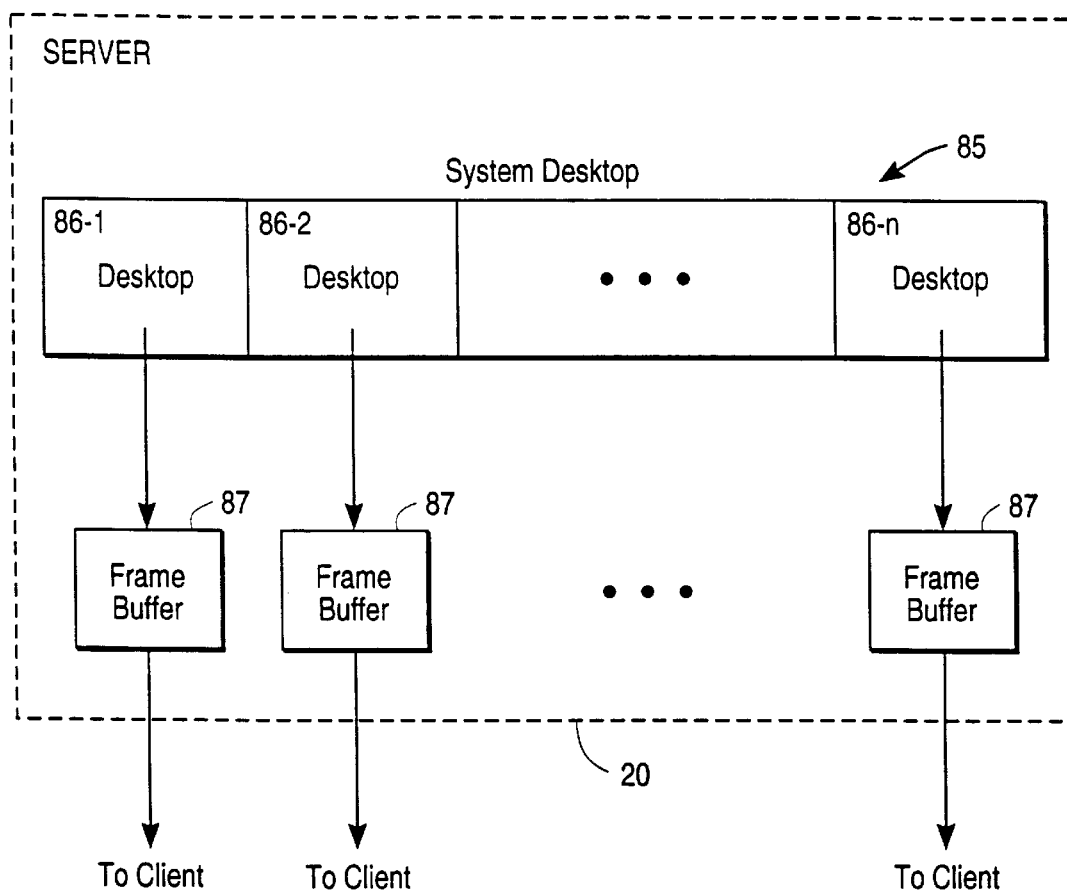
FIG. 7 illustrates a system work area partitioned into a number of client desktops, each having a corresponding frame buffer.

The operating system executing on the server 20 maintains a system work area. The system work area may be the standard desktop of the server 20; however, it is not referred to as such in this description to avoid confusion with the desktops of the individual client systems. In one embodiment, the desktops associated with the individual client systems are created as subsets of the system work area. This approach is illustrated in FIG. 7. Note, however, that in other embodiments of the present invention, the desktops may not be subsets of a single system work area.

FIG. 7 illustrates the system work area 85 maintained by the server 20. The server 20 is to be used by up to n client systems simultaneously. Accordingly, the system work area 85 is partitioned by the MCMS into n client desktops 86-i (i=1, 2, . . . , n). If the operating system of the server is windows-based, each of the desktops 86-i may be defined as a window within the system work area 85. This partitioning process is done in a manner that is non-disruptive of, and transparent to, the operating system. Each of the client desktops is rendered into its own assigned frame buffer 87.

In the embodiment of FIG. 7, the system work area 85 is essentially the root-level desktop for the desktops 86-i. Each of the desktops 86-i is a container environment that holds the window or windows of one or more applications in a given user context. Each desktop 86-i has its own cursor or insertion point and a facility for launching applications. Each desktop 86-i functions independently from applications that are not associated with it and independently from other desktops.

Figure 8:
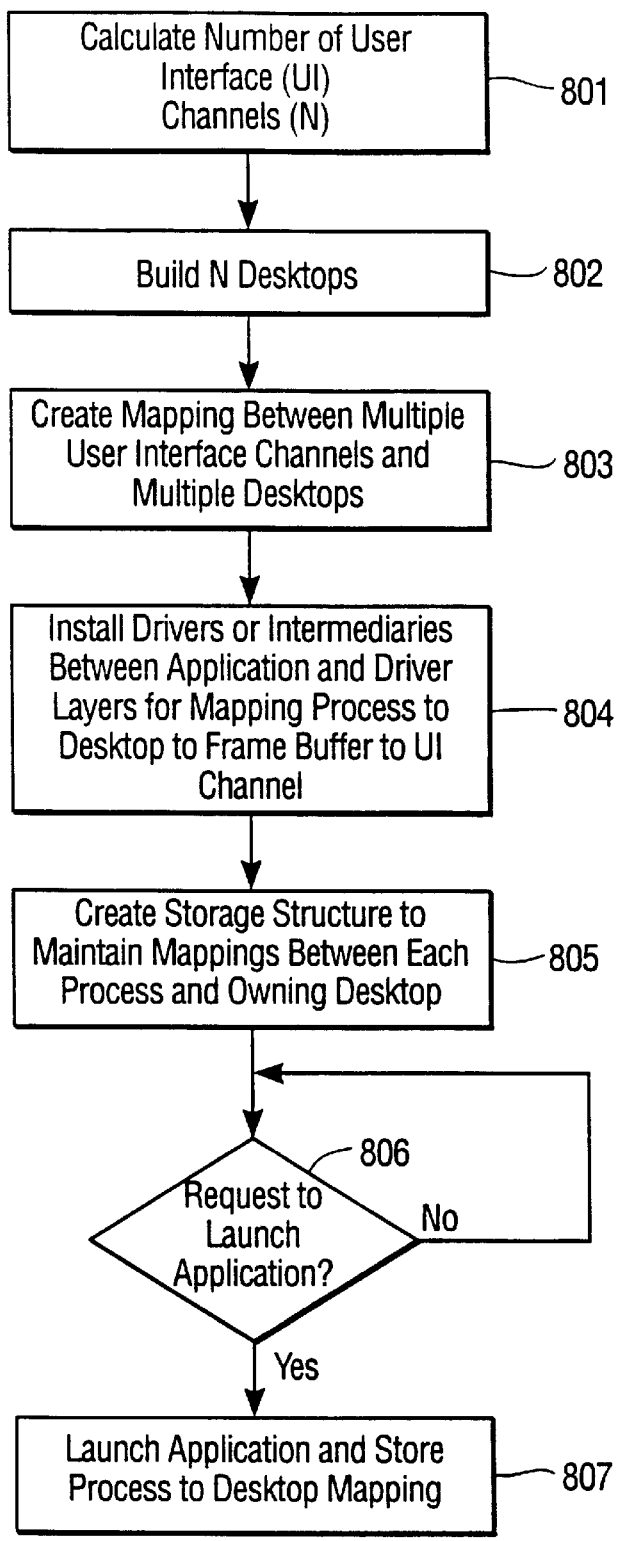
FIG. 8 is a flow diagram illustrating a routine for mapping multiple desktops to multiple client systems.

FIG. 8 illustrates a routine by which the MCMS creates multiple desktops and associates them with the corresponding client systems. Initially, the MCMS core 81a (FIG. 6) calculates the number of UI channels, n (801). This calculation may be made based on any of various criteria, such as the number of external connectors currently plugged into the card 45, or it may be based upon user inputs entered from the server 20 via software. The MCMS core 81a then builds n desktops (802) and creates a mapping between the n UI channels and the n desktops (803). Next, the MCMS core 81a installs the MCMS metadrivers 81b, which function as intermediaries between the application and driver layers, for mapping process-to-desktop, desktop-to-frame buffer, and frame buffer-to-video channel (804). This step (804) includes a number of sub-steps, which are described below. Next, the MCMS creates a storage structure to maintain the mapping between each process and its owning desktop (805). When a request to launch an application is received from a client system (806), the MCMS signals the operating system to launch the application and stores the process-to-desktop mapping (807

Figure 9:
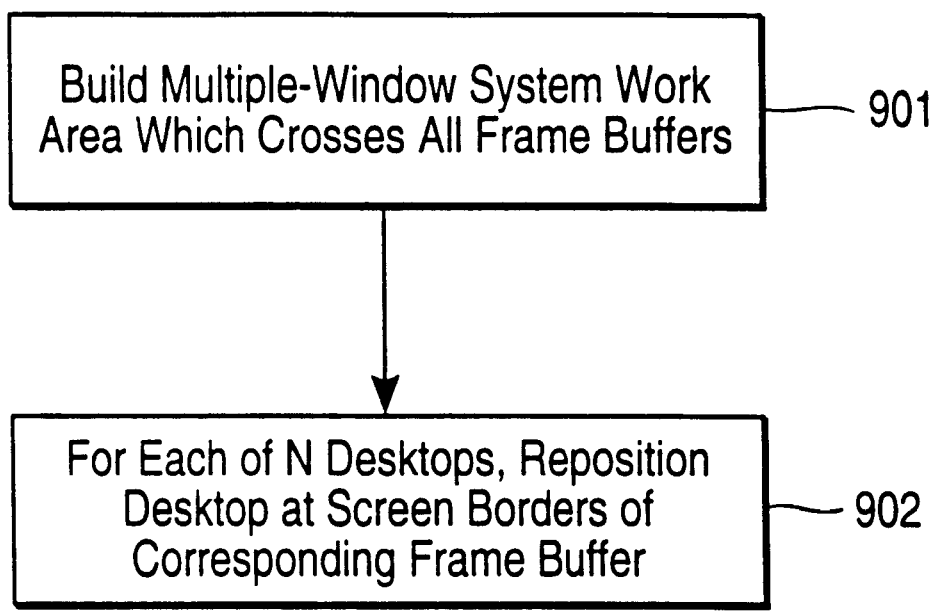
FIG. 9 is a flow diagram illustrating a routine for creating multiple desktops from a single system work area.

The installation of metadrivers (804) for performing the various mappings includes a procedure for modifying the single user I/O systems associated with the server 20 to allow separate desktops to be provided to separate users. Such a procedure is illustrated in FIG. 9. Specifically, the MCMS builds a multiple-window system work area, as shown in FIG. 7, which overlaps all frame buffers (901). Then, each of the n desktops is repositioned at the screen borders of its corresponding frame buffer (902).

Figure 10:
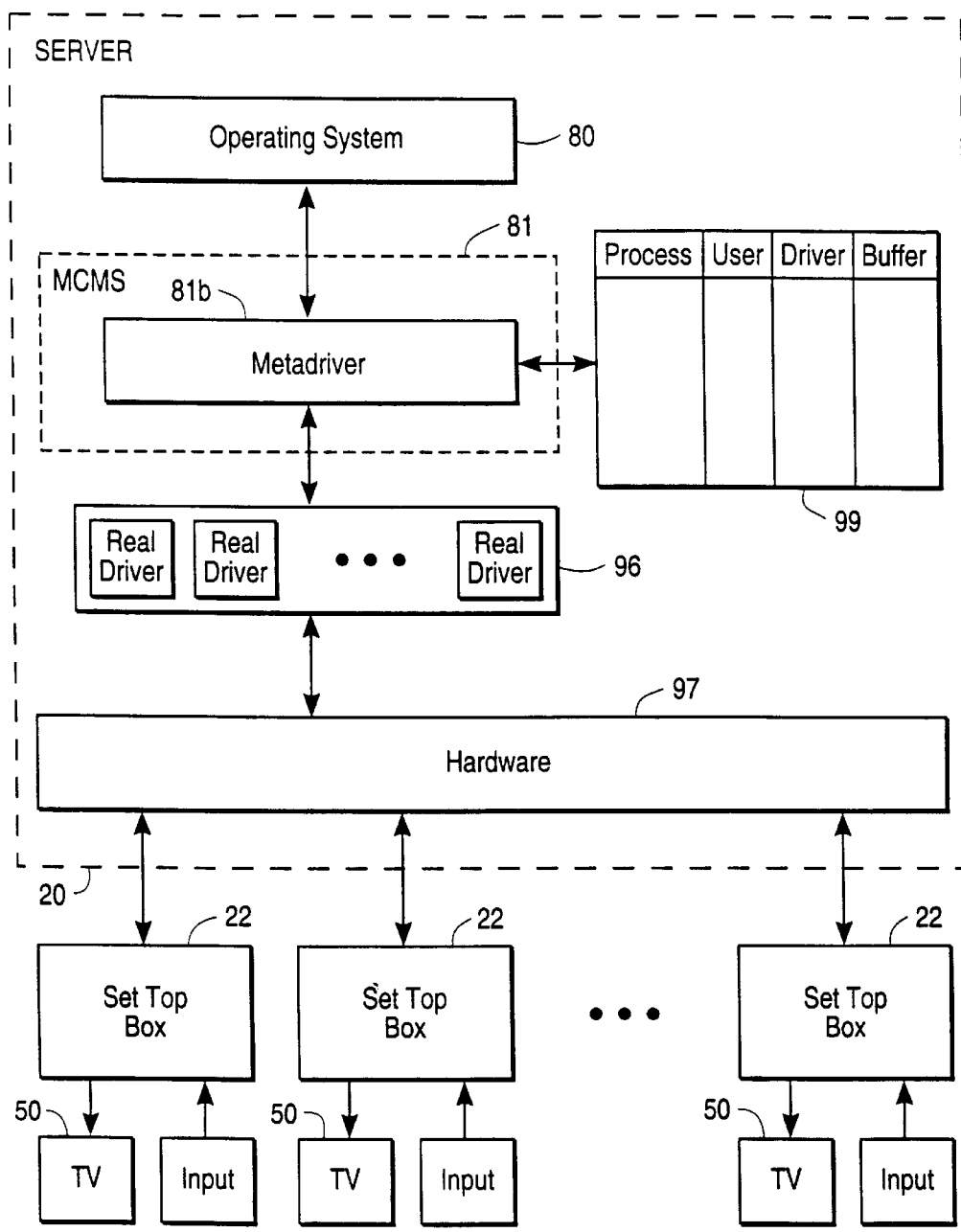
FIG. 10 is a block diagram illustrating the manner in which a metadriver provides multiple clients with access to their real drivers within the server.

The installation of metadrivers (804) also includes a procedure for modifying the I/O systems of the server 20 to allow separate desktops to be bound to separate I/O device drivers. Refer now to FIG. 10, which illustrates this approach. For each class of I/O (audio, video, etc.), separate I/O hardware 97 is included in the server 20 for each client. For a given class of I/O, the hardware 97 may include, for example, a video controller and frame buffer, or an audio controller. A separate device driver is associated with the hardware 97 for each client system; hence, the server 20 includes a number of real device drivers 96.

In accordance with the present invention, the MCMS 81 includes a metadriver 81b for each class of I/O. The metadriver 81b maintains a mapping table 99, which specifies, for each process, the mapping to a particular user, real device driver, and buffer. The metadriver 81b operates as an intermediary between the real drivers and the operating system and is called when a call for its class of I/O is made. The metadriver 81b then determines which user made the call and, therefore, which real driver to call to perform the requested I/O operation for that user. More specifically, when a user input is received by the server 20 from one of the client systems, the corresponding real driver 96 is called normally and generates an output intended for the operating system 80 (e.g., an interrupt, a procedure call, etc). However, the metadriver 81b intercepts the output of the real driver, performs a lookup in the table 99 to determine which process maps to the received user input, and then passes the real driver's output to the correct process. For example, when a user input representing a keystroke is received, the metadriver 81b will, after identifying the corresponding user, use the table 99 to look up and notify the appropriate process. Similarly, when the operating system 80 generates an output intended for a real driver 96, such as in response to an output of a user application, the metadriver 81b intercepts this output, identifies the correct real driver for that process using the table 99, and then provides that output to the correct real driver 96.

Figure 11:
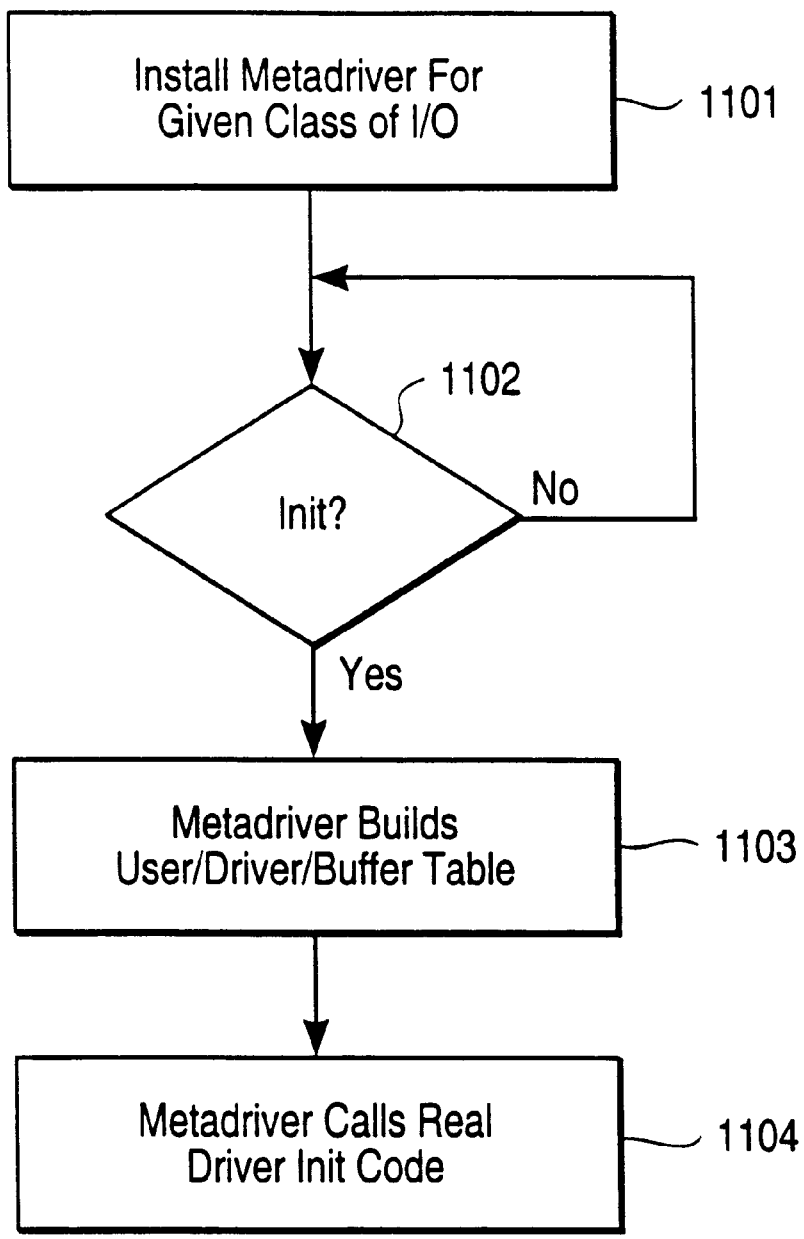
FIG. 11 is a flow diagram illustrating a routine for installation and operation of a metadriver.

FIG. 11 illustrates a routine performed by the MCMS in connection with installation and operation of a metadriver.

Initially, a metadriver is installed for a given class of I/O (1101). In response to a system initialization (1102) (i.e., boot-up of the server 20), the metadriver builds a mapping table (1103), such as table 99 in FIG. 10. The metadriver then calls the real driver initialization code associated with each real driver of that class of I/O (1104).

Figure 12:
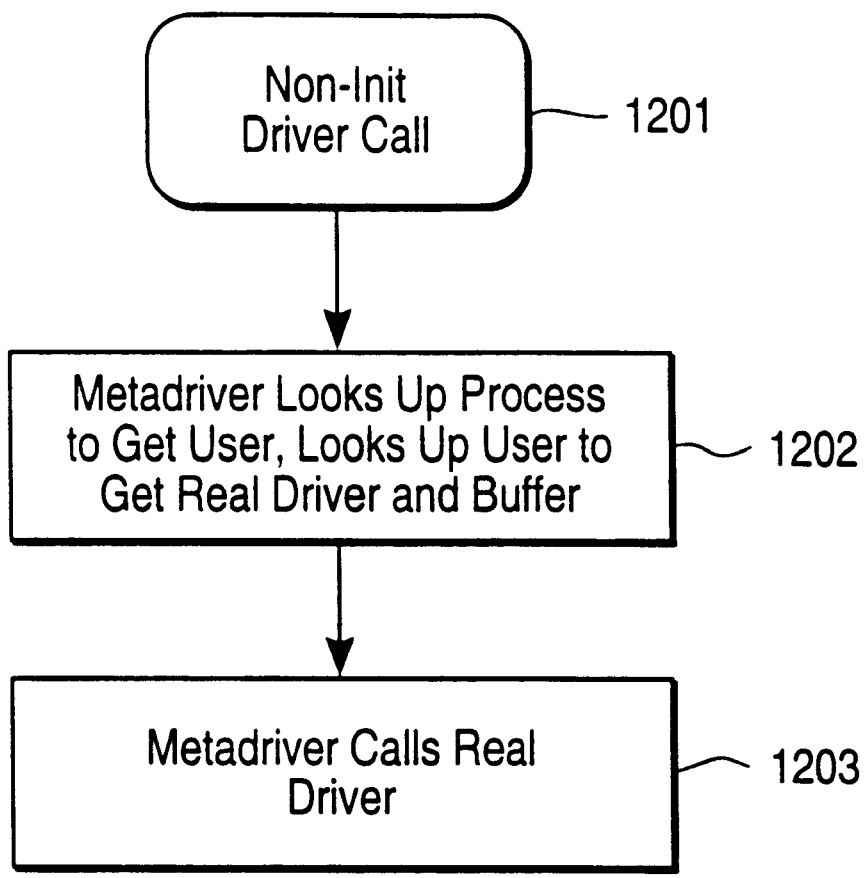
FIG. 12 is a flow diagram illustrating a routine for responding to a driver call.

While the routine of FIG. 11 is associated with system initialization, FIG. 12 illustrates a routine for responding to a post-initialization driver call from a client system. In response to such a call (1201), the metadriver for the appropriate class of I/O looks up the process in the mapping table to determine the appropriate user and looks up the user to determine the appropriate real driver and frame buffer (1202). The metadriver then calls the appropriate real driver (1203).

Figure 13:
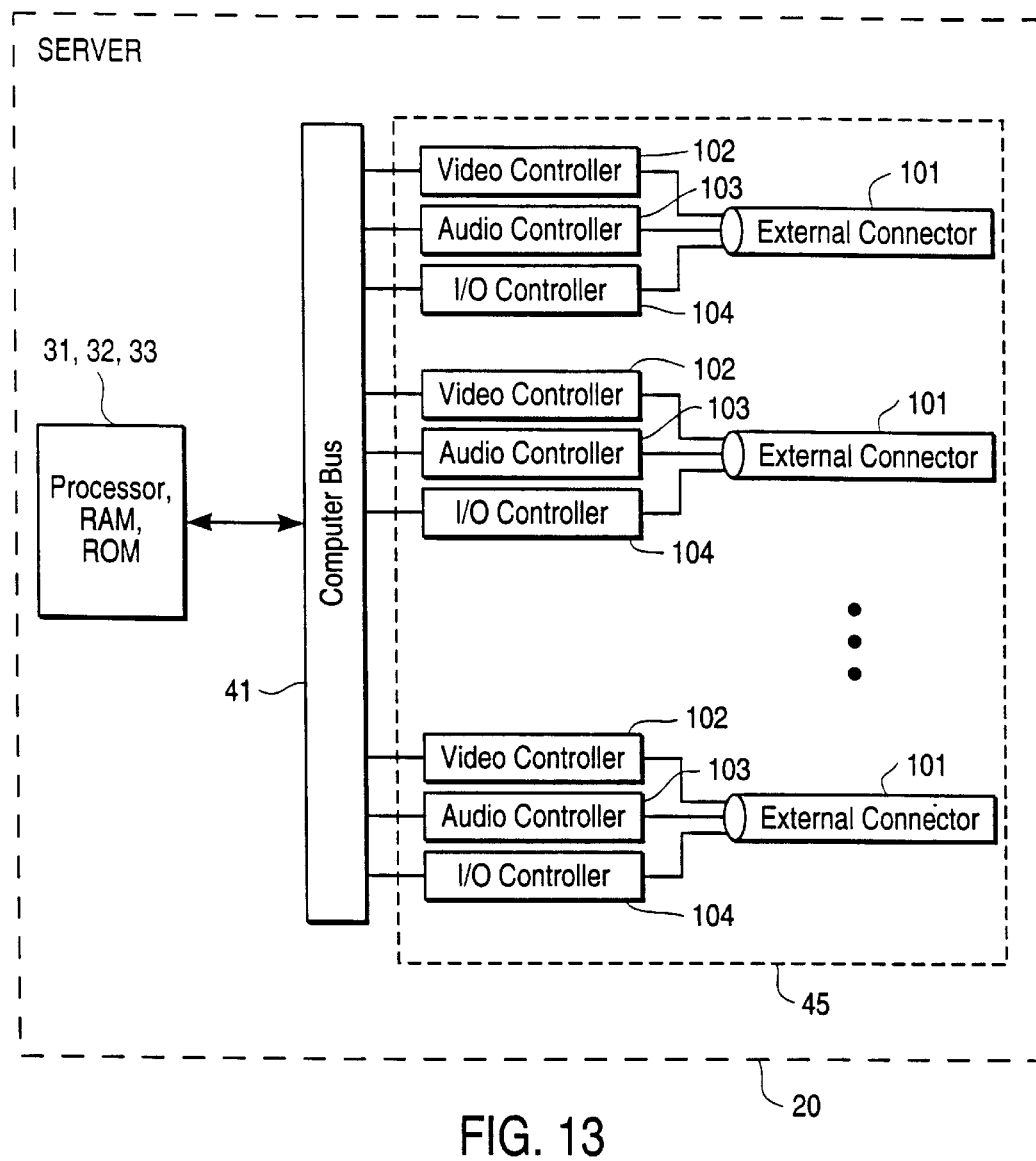
FIG. 13 is a block diagram showing the server for an embodiment based on a one-to-one network topology.

The components of the server 20 will now be discussed in greater detail. FIG. 13 is a block diagram of the server 20 for an embodiment which uses a separate point-to-point connection between the server 20 and each set top box 22 (see FIG. 4). As noted above, certain components, such as the video controllers/frame buffers, audio controllers, and I/O controllers may be implemented on the add-in card 45 coupled to the bus system 41 of the server 20. Hence, in the embodiment of FIG. 13, for each client system the card 45 includes a separate video controller 102 (each of which includes a frame buffer), an audio controller 103, and an I/O controller 104, each coupled to the bus system 41 of the server 20, and the outputs of which are each routed through a single external connector 101. The connector 101 may be an RJ-45 connector, as noted above. The I/O controller 104 for each client system controls communication of user inputs received from the corresponding client system and communication of control and status information between the server 20 and that client system.

Figure 14:
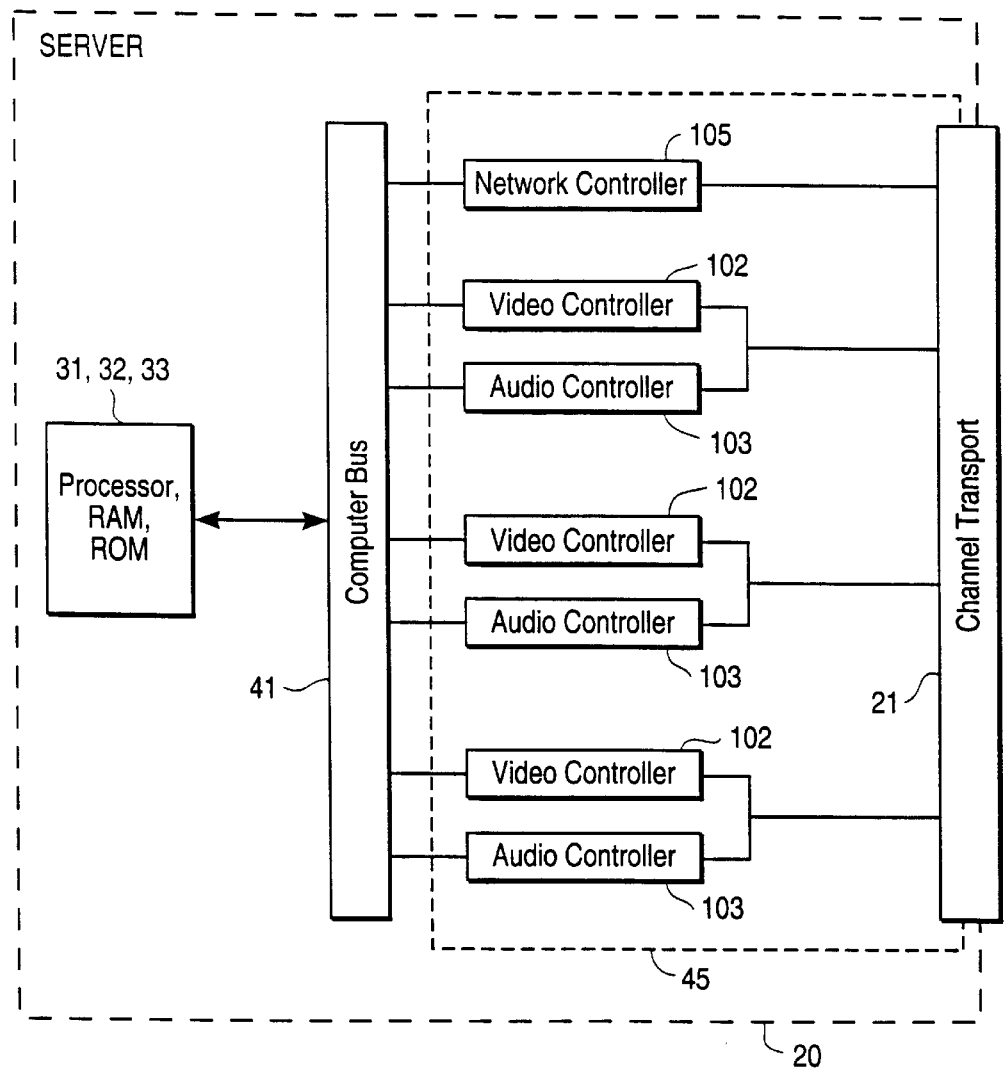
FIG. 14 is a block diagram showing the server for an embodiment based on a bus network topology.

FIG. 14 is a block diagram of the server 20 for an embodiment which uses a bus topology, as in FIG. 5. As in the point-to-point embodiment, the card 45 includes, for each of the client systems, a video controller 102 and an audio controller 103, each coupled to the bus system 41 of the server 20. However, network information, i.e., user inputs and control and status information, is communicated using a single network controller 105, which is also coupled to the bus system 41. The video and audio controllers 102 and 103 and the network controller 105 each provide their output to the channel transport 21 through a coaxial connector (not shown). In this embodiment, the channel transport 21 represents the coaxial bus 65 and associated hardware for interfacing components to the bus 65. In the server 20, the channel transport 21 includes the coaxial connector, modulators for modulating audio and video information for each client system onto a different video channel and for modulating the output of the network controller 105 onto the network channel. Note that "video channel" is not synonymous with "UI channel" in this description; a UI channel is a complete collection of I/O facilities for a given user, which may include a video channel..

Figure 15:
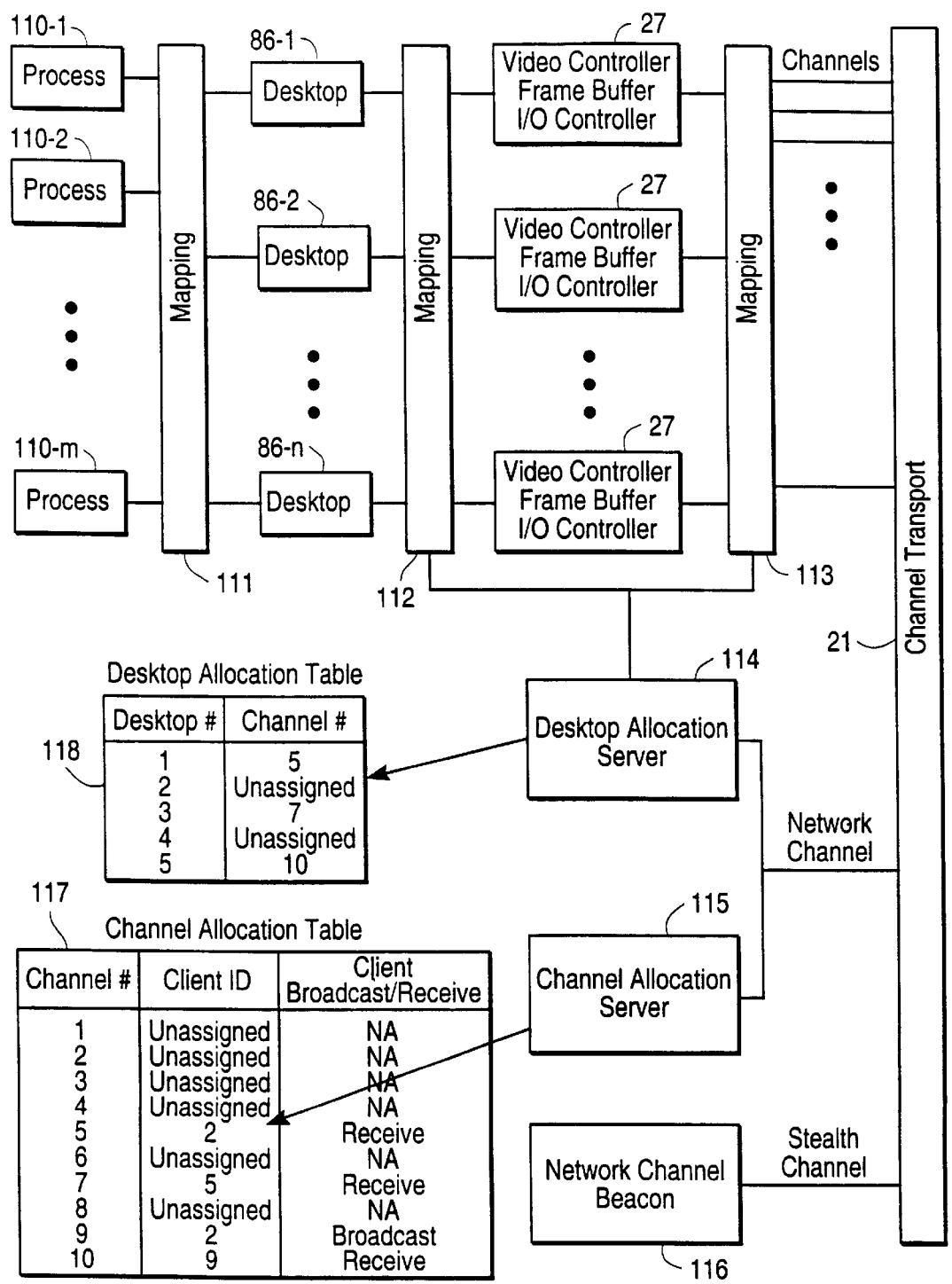
FIG. 15 is a block diagram of the server for an embodiment based on a bus network topology.

FIG. 15 illustrates another block diagram of the server 20 for the bus topology, which illustrates the interaction between the various functional units of the server 20. FIG. 15 is intended to convey the functions associated with the server 20 and is not intended to represent any particular architecture or physical embodiment. Hence, the individual units shown in FIG. 15 may be rearranged in various different ways or combined without departing from the scope of the present invention. The server 20 maintains m processes 110-j (j=1, 2, . . . , m) and n independent, simultaneously active desktops 86-i (i=1, 2, . . . , n). Each process 110-j is associated with a particular user and, therefore, with a particular desktop 86-i. Mapping unit 111 maps each process 110-j to the correct desktop 86-i. Another mapping unit 112 maps each desktop 86-i to the correct video controller/frame buffer/I/O controller set 27. A third mapping unit 113 maps the contents of each frame buffer 27 to a video channel for transmission onto the channel transport 21.

A desktop allocation server (DAS) unit 114 allocates desktops 86-i to individual client systems in response to requests from the client systems. The DAS unit 114 also controls operation of mapping unit 112 (for desktop-to-frame buffer mapping) and operation of mapping unit 113 (for frame buffer-to-video channel mapping). The DAS unit 114 maintains a table 117 specifying the channel assigned to each desktop.

A channel allocation server (CAS) unit 115 allocates video channels to individual client systems in response to requests from the client systems. Because desktops and video channels may be separate resources with independent availabilities, they are allocated separately. Alternative embodiments, however, may allocate desktops and video channels together. Thus, the CAS unit 115 maintains a table 117, which specifies an identifier (ID) of the client system assigned to each channel, if any, and whether that channel is designated as a broadcast channel or a receive channel. Note that the particular contents of table 117 and 118 shown in FIG. 15 are only for purposes of illustration.

A given client system may be assigned more than one video channel. Specifically, each client requires a receive channel for receiving a desktop (and other data) from the server; however, a client may also request a broadcast channel for transmitting data to the server 20. A broadcast channel might be needed, for example, for purposes of transmitting audio and video data to the server 20 to maintain a video teleconference or to record a cable TV program.

Communication between client systems and DAS 114 or CAS 115 is performed via the network channel (the channel shared by all client systems). Accordingly, in the illustrated embodiment, the server 20 also includes a network channel beacon 116 for informing the client systems of the location of the network channel. Specifically, the network channel beacon 116 uses a "stealth" channel to broadcast an indication of which channel is being used as the network channel onto the channel transport 21 at regular intervals. In this embodiment, all set top boxes 22 are preconfigured to receive the stealth channel. It may be desirable to select a frequency that is not commonly used, such as a very low or very high frequency, as the stealth channel.

In other embodiments that use a bus topology, the network channel beacon 116 may be omitted. For example, the network channel can be set by using a manual control on each set top box 22, such as push buttons, or by using the remote control.

The mapping units 111, 112, 113, DAS unit 114, CAS unit 115, and network channel beacon 115 may be implemented in software which executes on the server 20, i.e., they may be components of the MCMS. It will be understood that in such embodiments, it is actually the execution of code by a processor which performs the functions of these components. Note that in other embodiments, some or all of these components may be implemented in hardware or in combinations of hardware and software.

Figure 16:
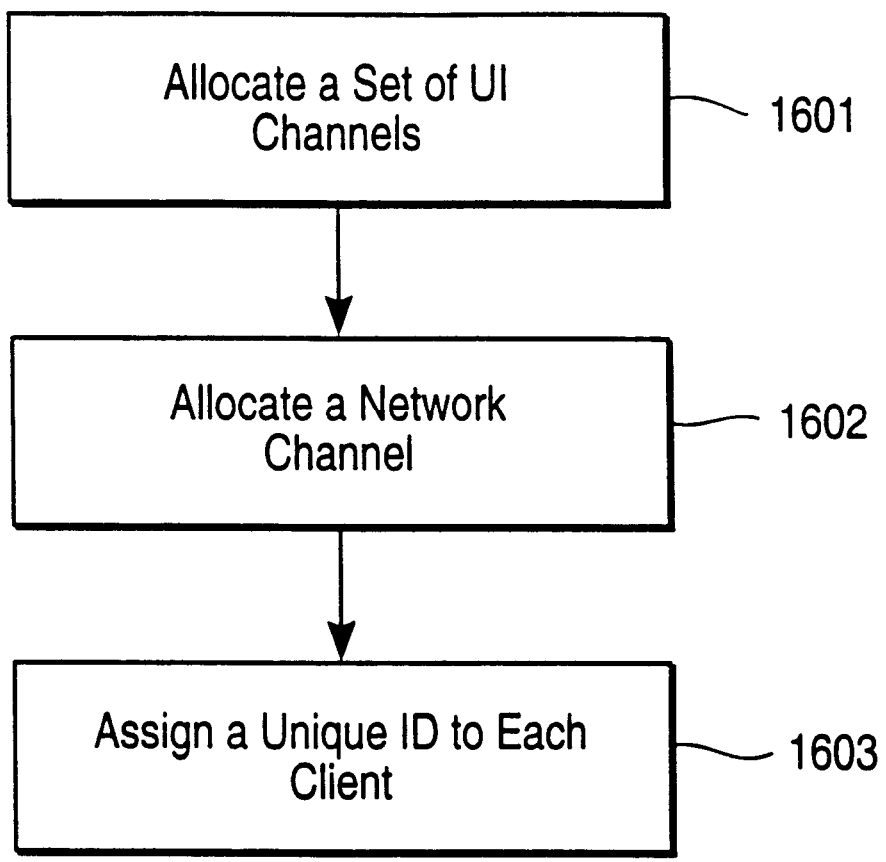
FIG. 16 is a flow diagram illustrating a routine for allocating multiple channels for multiple client systems.

FIG. 16 illustrates a routine performed by the MCMS to establish communication between the server 20 and client systems in an embodiment based on a bus topology. Initially, the MCMS allocates a set of video channels that can be assigned to client systems (1601). As noted above, the video channels may be conventional cable TV channels, the content of which has been filtered. The MCMS further allocates a network channel for communication of user inputs and control and status information between the server 20 and all client systems (1602). The MCMS also assigns a unique ID to each client system (1603).

Figure 17:
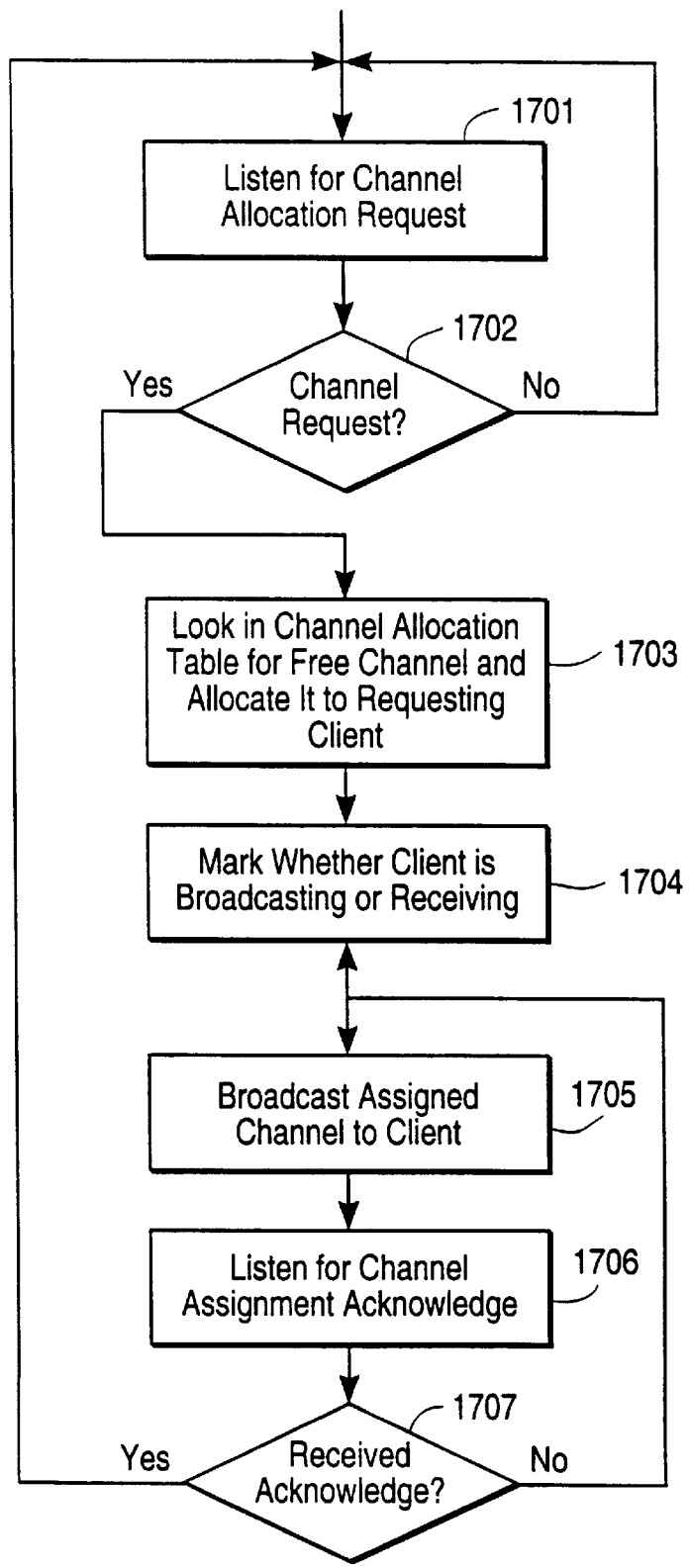
FIG. 17 is a flow diagram illustrating a routine for allocating a channel to a client system.

FIG. 17 illustrates a routine representing functions of the CAS unit 115. Initially, the CAS unit 115 waits for a channel allocation request from one of the client systems on the network channel (1701). A channel allocation request may or may not be associated with a corresponding desktop allocation request. An example of a channel allocation request that is not associated with a desktop allocation request is a request for a transmit channel in response to a video camera being connected to the set top box 22. Thus, when a channel allocation request is received (1702), the CAS unit 115 performs a look-up in the channel allocation table 117 for an available channel and allocates the available channel to the requesting client system (1703). The CAS unit 115 then marks in the table 117 whether the channel is a broadcast or receive channel (1704). An identification of the assigned channel is then broadcast onto the channel transport 21 on the network channel (1705). The server 20 then waits to receive a channel assignment acknowledgment on the network channel (1706), and when the acknowledgment is received, returns to listening for a channel allocation request (1701). If no acknowledgment is received after a predetermined period of time, the CAS unit 115 causes the assigned channel identification to be rebroadcast (1705), and the routine repeats accordingly (from 1705).

Figure 18:
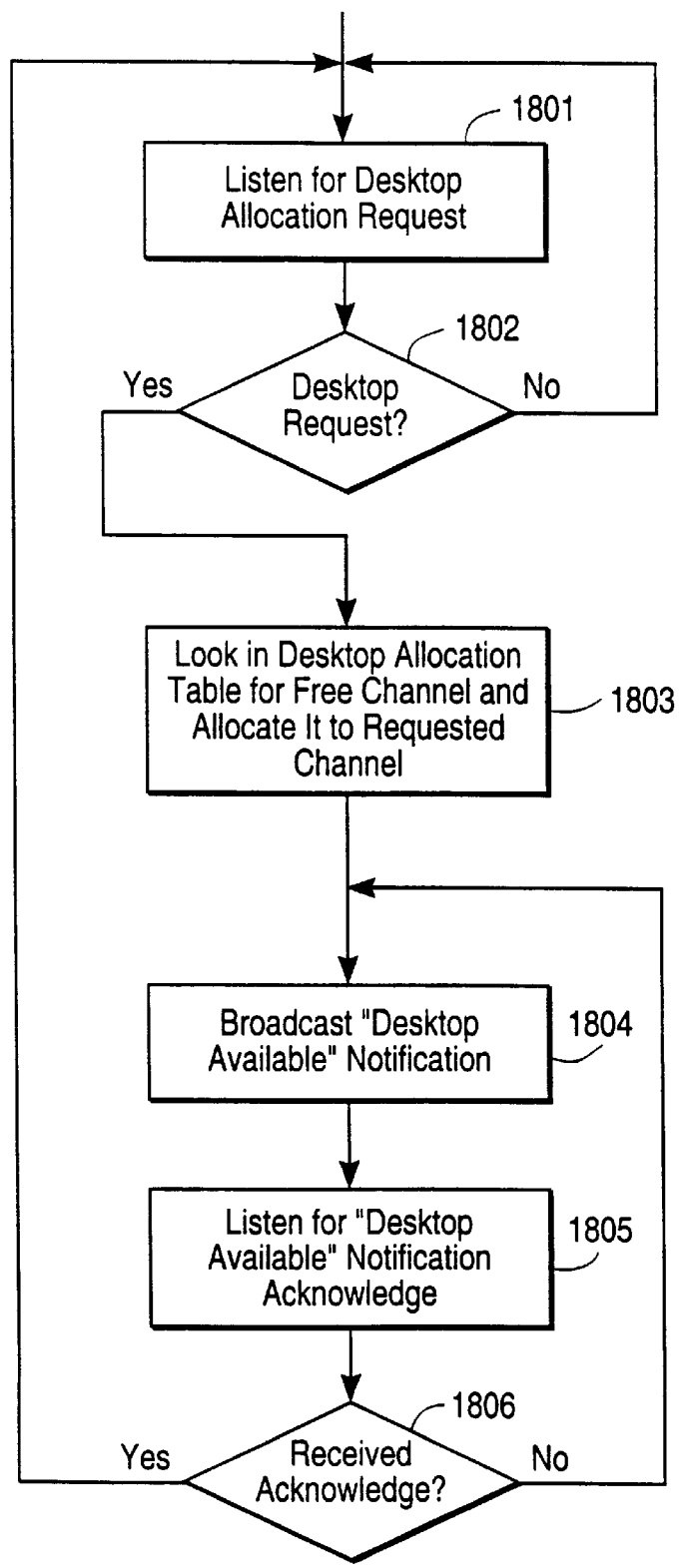
FIG. 18 is a flow diagram illustrating a routine for allocating a desktop to a client system.

FIG. 18 illustrates a routine representing functions performed by the DAS unit 114. Initially, the DAS unit 114 waits for a desktop allocation request from a client system via the network channel (1801). When such a request is received (1802) the DAS unit 114 performs a look-up in the desktop allocation table 118 for an available channel and, if a channel is available, allocates a new desktop to the available channel (1803). A desktop allocation request (or a channel allocation request) may be transmitted by a client system when, for example, the user first logs onto a client system or reinitializes the client system. Once the desktop has been allocated to a video channel, the server 20 broadcasts a "desktop available" notification onto the network transport 21 via the network channel (1804). Next, the server 20 waits for an acknowledgment of the desktop available notification on the network channel (1805). If such acknowledgment is received (1806), then the DAS unit 114 returns to listening for a desktop allocation request (1801). If no acknowledgment is received after a predetermined period of time, then the DAS unit 114 again broadcasts the "desktop available" notification (1804), and the routine is repeated accordingly (from 1804).

III. Set Top Box

Figure 19:
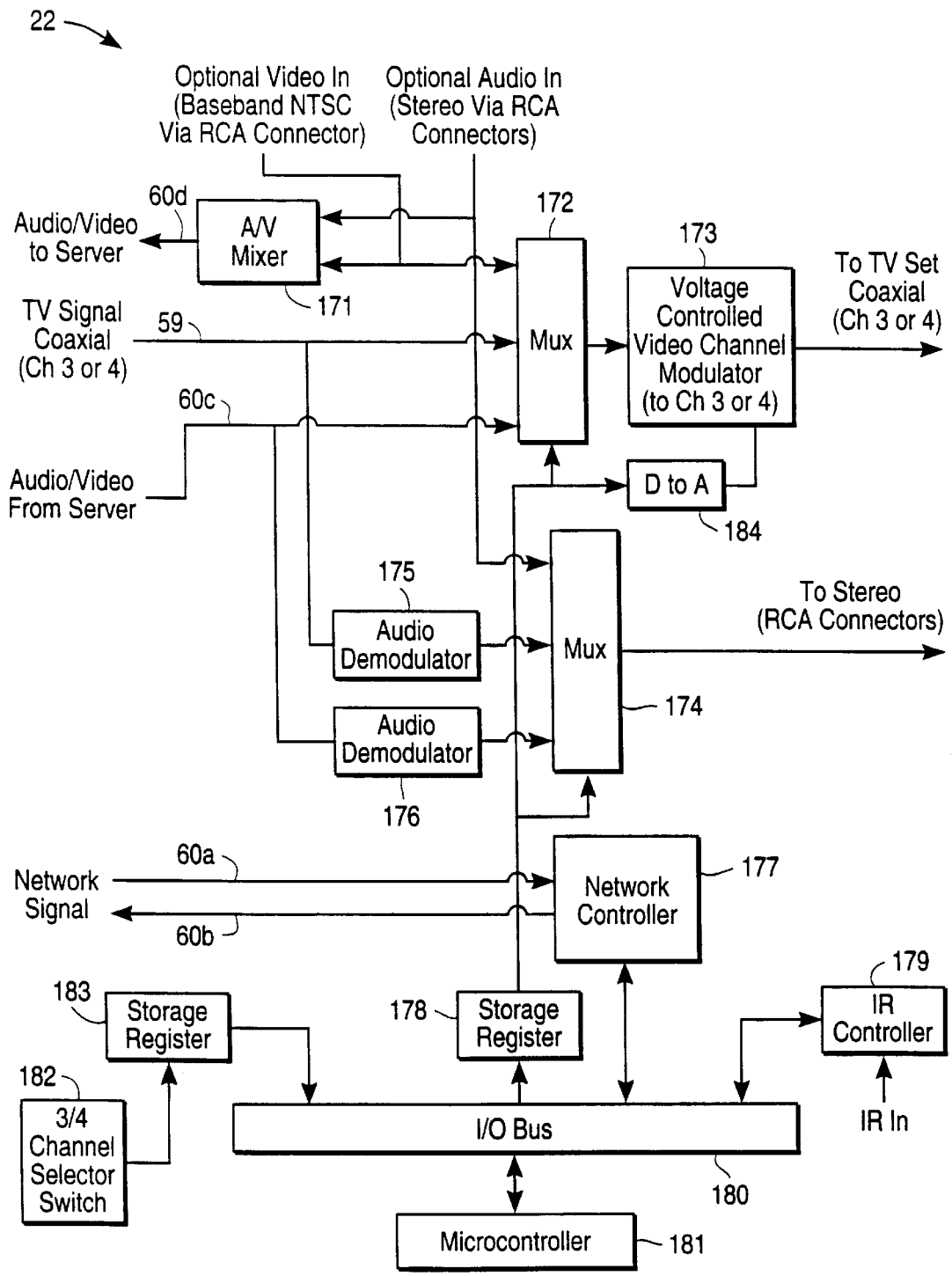
FIG. 19 is a block diagram illustrating a set top box for an embodiment based on a one-to-one network topology.

FIG. 19 shows a block diagram of an embodiment of the set top box 22 for use with a one-to-one network topology (see FIG. 4). The illustrated embodiment includes a microcontroller 181, which controls operation of the set top box 22, and which is coupled to an I/O bus 180. The set top box also includes A/V mixer 171, multiplexers 172 and 174, a voltage controlled video channel modulator 173, audio demodulators 175 and 176, network controller 177, storage registers 178 and 183, IR controller 179, I/O bus 180, channel selector switch 182, and digital-to-analog (D/A) converter 184. User inputs are provided to the set top box 22 via the IR controller 179, which is coupled to the I/O bus 180. A channel selection (e.g., channel 3 or 4) is input manually by a user using selector switch 182 to determine on which channel the set top box will receive cable TV signals from the cable box 51 and the signal will be sent to the TV 23. The selection from switch 182 is stored in register 183, the output of which is provided to the microcontroller 181 via I/O bus 180.

As indicated above, in a one-to-one network, communication between the set top box 22 and the server 20 may occur over standard four-pair telephone wires 60, which in the illustrated embodiment include pairs 60a, 60b, 60c, and 60d. Two of the pairs, 60a and 60b, are used as a digital channel (e.g., Ethernet) for communication of user inputs and control and status information between the server 20 and the set top box 22. The set top box 22 includes a network controller 177 for providing the digital communication, which is coupled to the microcontroller 181 through I/O bus 180. Network controller 177 transmits digital information, such as user inputs, desktop allocation requests, etc., to the server 20 over lines 60b and receives digital information, such as request acknowledgements and status information from the server 20 over lines 60a.

Communication of audio and video data between the set top box 22 and the server 20 occurs over pairs 60C and 60D. The video data received over pair 60C includes, for example, desktop information. Pair 60C and line 59 from the cable converter box 51 are input to multiplexer 172. Multiplexer 172 also receives a third input from the optional video input of the set top box 22 input (e.g., from a video camera). The output of multiplexer 172 is provided to voltage-controlled video channel modulator 173. Selection of an input of multiplexer 172 is performed according to a value stored in storage register 178, which is set by microcontroller 181 via the I/O bus 180. The output of storage register 178 is also applied to D/A converter 184. The output of D/A converter 184 sets the channel (e.g., channel 3 or 4) of video channel modulator 173. The output of video channel modulator 173 is provided to the connected television set 23 via coaxial cable. Thus, multiplexer 172 is used for selection, for display on the television set 23, between video data received from the server 20, video data received from the cable box 51, and video data received from the optional video.

A/V mixer 171 has two inputs, one from the optional video input, and the other from the optional audio input of the set top box 22 (e.g., from an external microphone). A/V mixer 171 combines data received on either of its two inputs with data received on the other input (if any) and then passes the resulting data stream on to the server via pair 60D.

Each of audio demodulators 175 and 176 demodulates input audio data according to a preset modulation frequency. Audio demodulator 175 receives as input the signal on line 59 from the cable box 51, and provides an output to multiplexer 174. Audio demodulator 176 receives as input the signal on pair 60C from the server 20, and provides an output to multiplexer 174.

The three inputs of multiplexer the outputs of audio demodulators 175 and 176 and the optional audio input of the set top box 22. The output of multiplexer 174 is provided to the RCA stereo output of the set top box 22, which may be connected to a conventional stereo tuner/amplifier, for example. Selection of the input of multiplexer 174 is performed according to the value stored in storage register 178.

Figure 20:
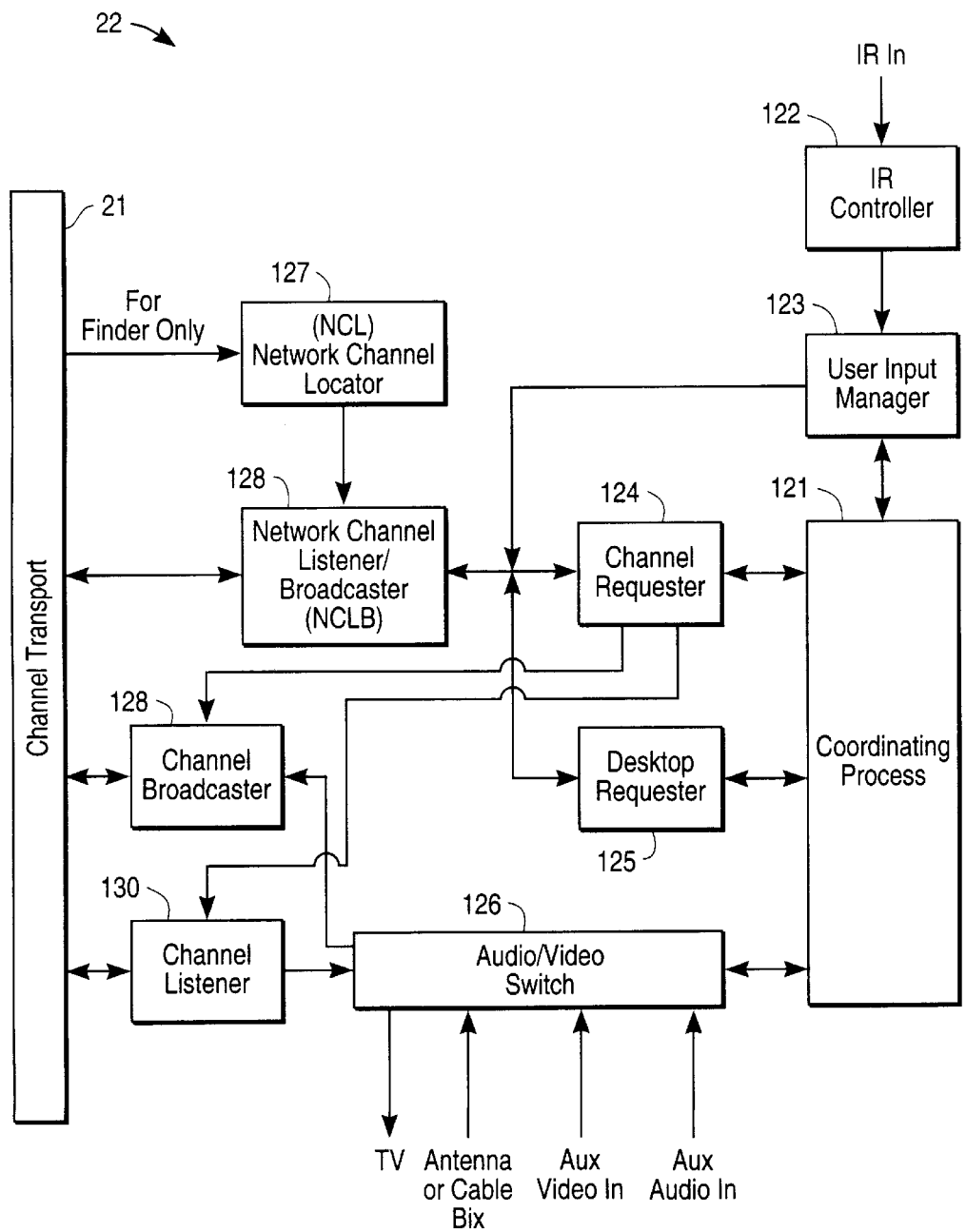
FIG. 20 is a block diagram of the set top box for an embodiment based on a bus network topology.

FIG. 20 shows a block diagram of the set top box 22 for an embodiment based on a bus network topology (see FIG. 5). Certain elements of the channel transport 21 are located within the set top box 22, including a coaxial connector. In the embodiment of FIG. 20, the set top box 22 includes an IR controller 122, which receives an IR input detection signal from the IR detector 58. Outputs of the IR controller 122 are provided to the user input manager 123. A coordinating process 121 coordinates user inputs for requesting channels and desktops. The user inputs are input to the coordinating process 121 via the IR controller 122. The user input manager 123 coordinates communication between the IR controller 122 and the coordinating process 121.

A network channel listener/broadcaster (NCLB) 128 uses the network channel to broadcast user inputs, channel allocation requests, and desktop allocation requests onto the channel transport 21 and to receive channel and desktop assignments and other information from the server 20. The particular channel on which the NCLB 128 receives and broadcasts is determined by the network channel locator (NCL) 127, which identifies the network channel to the NCLB 128. In embodiments according to FIG. 15, the NCL 127 may be coupled to the channel transport 21 to listen on the stealth channel for the repeatedly broadcast location of the network channel. Alternatively, as mentioned above, the NCL 127 may be a manual switch or buttons on the set top box 22 or its remote control; in that case, NCL 127 would not be coupled to the channel transport 21.

A channel requester 124 is coupled to the coordinating process 121 and the NCLB 128. In response to a user input that requires allocation of a channel to the set top box 22 (e.g., logging onto a client system), the channel requester 124 signals the NCLB 128 to broadcast a channel allocation request onto the network channel. When the NCLB 128 receives a channel assignment from the server 20 via the network channel, the NCLB 128 forwards the channel assignment to the channel requester 124. The channel requester 124 in turn signals this fact to the coordinating process 121 and identifies the assigned channel to the channel broadcaster 128 (if the channel is a broadcast channel) or the channel listener 130 (if the channel is a receive channel).

The set top box 22 further includes a desktop requester 125, which responds to any user input that requires allocation of a desktop to the client system by signaling the NCLB 128 of this fact. The NCLB 128 responds to such a signal by broadcasting a desktop allocation request onto the network channel. When the NCLB 128 receives a desktop available notification, it broadcasts and acknowledgment onto the network channel and signals the desktop requester 125 that a desktop has been allocated. The desktop requester in turn signals this fact to the coordinating process 121.

The server 22 further includes an audio/video switch 126, which controls the routing of audio and video data within the set top box 122. The audio/video switch 126 communicates with the coordinating process 121, the channel broadcaster 128 and the channel listener 130. Desktop display data and other data is received on the assigned channel by the channel listener 130 via the channel transport 121. The channel listener 130 demodulates the data and provides it to the audio/video switch 126. The switch 126 then routes the demodulated data to the connected TV 23. Standard TV signals from a cable converter box or antenna are input to the audio/video switch 126 and routed appropriately to the TV, to the channel broadcaster 128 for transmission to the server 20, or both. The channel broadcaster 128 modulates audio or video data input to it to the assigned channel and transmits the modulated data onto the channel transport 21. Optional video or audio inputs, such as from a camera or microphone, are input to the switch 126 and routed appropriately to the TV 23, to a connected stereo system, to the channel broadcaster 128 for transmission to the server 20, or a combination thereof.

Figure 21:
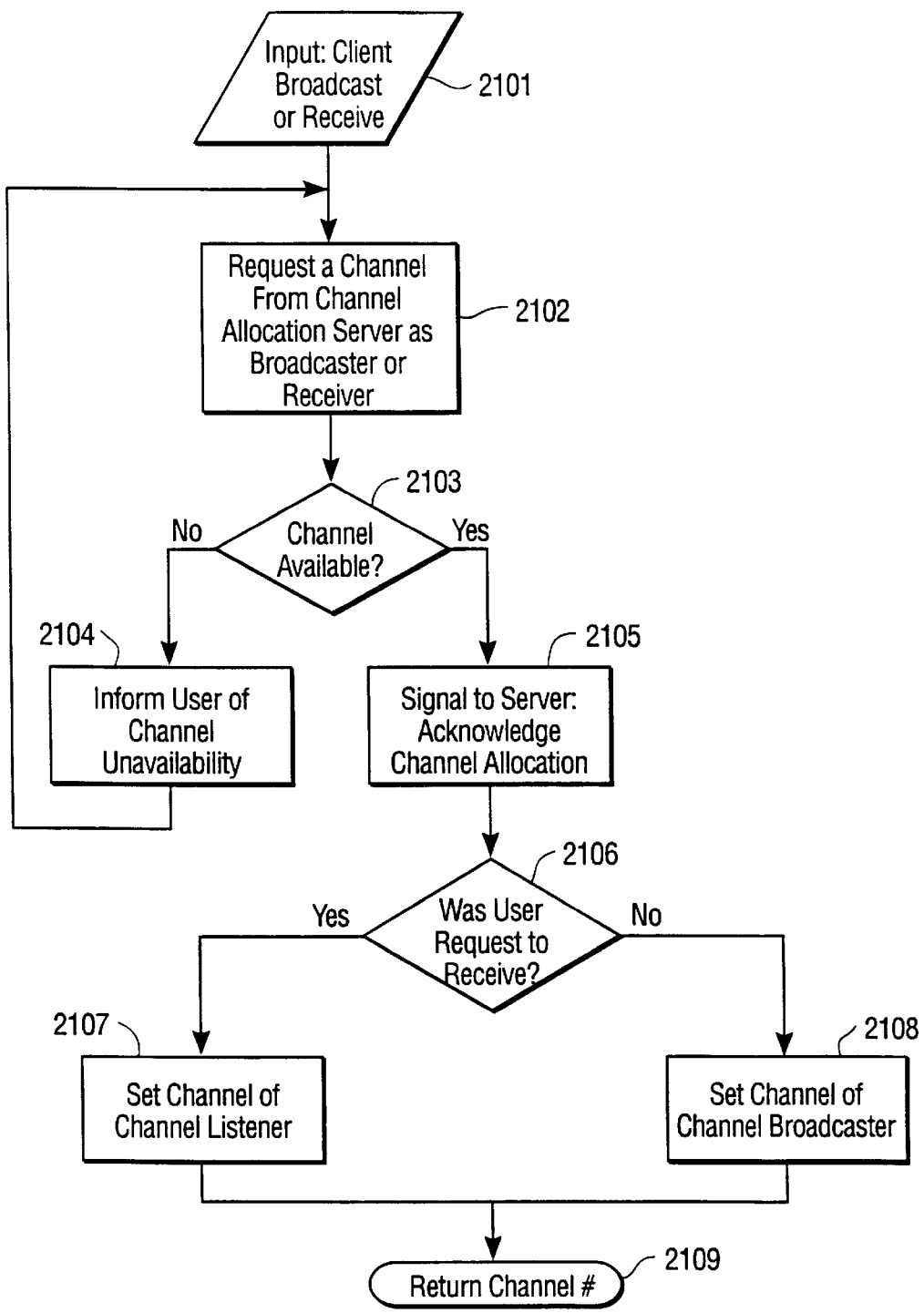
FIG. 21 is a flow diagram of a routine for requesting a channel.

FIG. 21 illustrates a routine representing the functions of the channel requester 124. The channel requester 124 may be thought of as the counterpart to the CAS unit 115 in the server 20 (FIG. 15). Initially, an input is received from the coordinating process 121, indicating a broadcast or a receive channel is required (2101). In response, the channel requester 124 signals the NCLB 128 to broadcast a channel allocation request onto the network channel (2102). The request includes the ID of the requesting set top box 22. If a notification is received from the server 20 (via the NCLB 128) that a channel is available, then the channel requester 124 signals the NCLB 128 to transmit an acknowledgment onto the network channel (2105). Otherwise, the user is informed via coordinating process 121 that a channel is unavailable (2104). The routine then repeats (from 2102) by requesting another channel until a channel becomes available.

After transmission of an acknowledgment (2105), then if the request was for a receive channel (2106), the channel requester 124 identifies the assigned channel to the channel listener 130 (2107). If the request was for a broadcast channel (2106), the channel requester 124 identifies the assigned channel to the channel broadcaster 128 (2108). The routine then returns the channel number to the coordinating process 121 (2109). The coordinating process 121 then passes the assigned channel number to the desktop requester 125.

Figure 22:
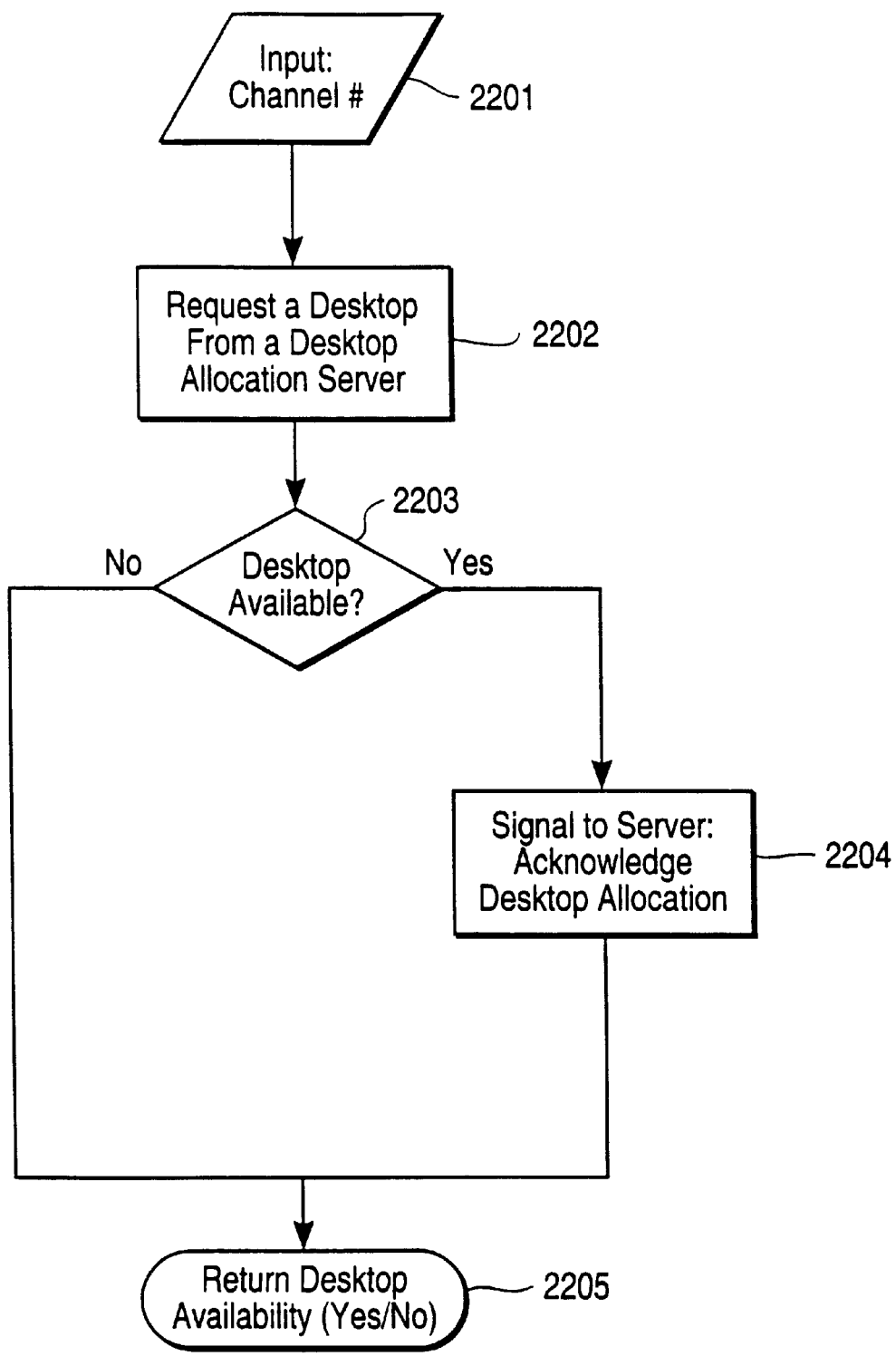
FIG. 22 is a flow diagram illustrating a routine for requesting a desktop.

FIG. 22 illustrates a routine representing functions performed by the desktop requester 125. The desktop requester 125 may be thought of as the counterpart to the DAS unit 114 in the server 20 (see FIG. 15). Initially, the assigned channel number is input to the desktop requester 125 (e.g., from the coordinating process 121) (2201). Next, the desktop requester 125 causes the NCLB 128 to broadcast a request for a desktop onto the network channel (2202). If a "desktop available" notification is then received from the server 20 (2203), then the desktop requester 125 signals the NCLB 128 to broadcast and acknowledgment onto the network channel (2204). An appropriate desktop availability notification (e.g., "yes" or "no") is then returned to the user via the coordinating process 121 (2205).

Figure 23:
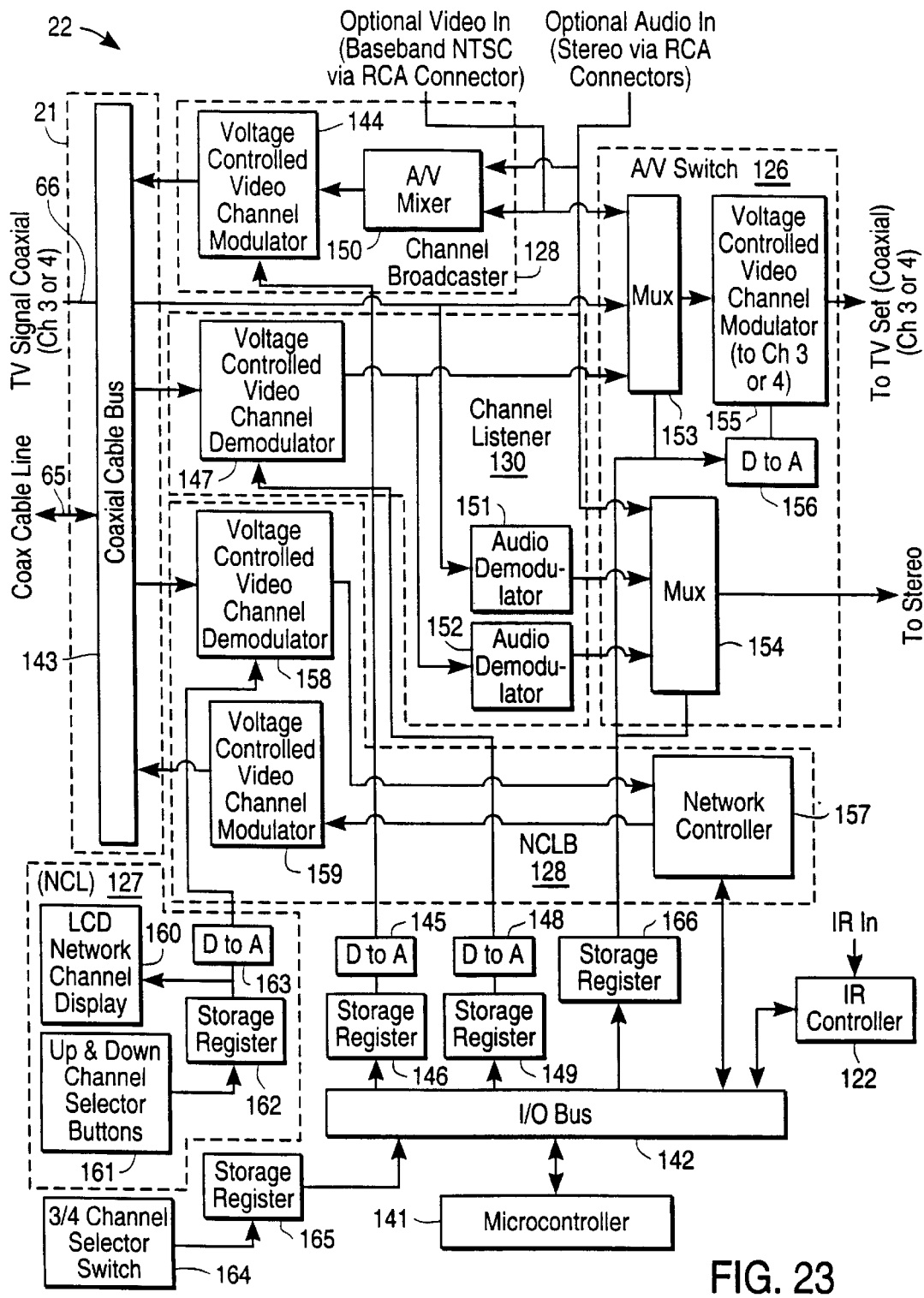
FIG. 23 is a block diagram of the set top box for an embodiment based on a bus network topology.

FIG. 23 is another block diagram of the set top box 22 for an embodiment based on a bus network topology. Operation of the set top box 22 is controlled by a microcontroller 141, which is coupled to an I/O bus 142. The channel transport 21 components in the box 22 include a coaxial cable bus 143, which is coupled to the coaxial network bus 65 (see FIG. 5) via a coaxial connector. Coaxial bus 143 is also connected to a separate coaxial input that is connected to the output 66 of the cable TV converter box 51. Switch 164 is used to manually select on which channel the set top box will receive cable TV signals from the cable box 51 and the signal will be sent to the TV 23 (e.g., channel 3 or 4).

The NCL 127 is shown in FIG. 23 according to an embodiment which does not employ a "stealth" channel to locate the network channel. Accordingly, in FIG. 23 the NCL 23 includes up and down channel selector buttons 161, a storage register 162, and a D/A converter 163. A network channel selection is input manually using buttons 161. The selection is stored in register 162, converted to an analog value by D/A converter 163, which provides the value to both the video channel demodulator 158 and the video channel modulator 159. The output of storage register 162 is also provided to an LCD display 160 to display the currently selected network channel to the user.

The NCLB 128 includes a network controller 157, a voltage-controlled video demodulator 158, and a voltage-controlled video modulator 159. The network controller 157 is coupled to the microcontroller 141 through the I/O bus 142 and is also coupled to the video demodulator 158 and the video modulator 159. An input of the demodulator 158 is coupled to the network coaxial bus 65 via the set top coaxial bus 143. Similarly, the output of the modulator 159 is coupled to coaxial bus 143. The network controller 157 controls transmission of channel and desktop allocation requests in response to commands from the microcontroller 141. In particular, the network controller 157 outputs channel and desktop allocation requests to the modulator 159 for modulation onto the network channel and receives demodulated acknowledgments from the demodulator 158, which are then signaled to the microcontroller 141. In addition, the network controller 157 receives user input data from the microcontroller 141 via the I/O bus 142 and provides user input data to video modulator 159 for transmission onto bus 143 on the network channel. The microcontroller receives user inputs from the IR controller 122 via the I/O bus 142.

The channel broadcaster 128 includes voltage-controlled video channel modulator 144 and A/V mixer 150. Video modulator 144 has an output coupled to coaxial bus 143 and an input coupled to an output of A/V mixer 150. A/V mixer 150 receives a first input from the optional audio input of the set top box 22 and a second input from the optional video input. A/V mixer 150 combines data received on either of its two inputs with data received on the other input (if any) and then passes the resulting data stream to video channel modulator 144. Video modulator 144 then modulates the video data or the combined audio and video data and then transmits the modulated data onto the cable bus 143 on the channel assigned to the set top box 22. The channel assigned to the set top box 22 for broadcasting is specified to video modulator 144 by an input received from the output of D/A converter 145. D/A converter 145 receives and converts to analog a value stored in register 146, which is set by the microcontroller 141 via I/O bus 142.

The channel listener 130 includes video channel demodulator 147, audio demodulator 151, and audio demodulator 152. Video data received from the network, including desktop display data, is received by video channel demodulator 147, which has an input coupled to the coaxial cable bus 143. Video channel demodulator 147 demodulates data at the assigned channel and outputs the demodulated data to multiplexer 153, which is part of the audio/video switch 126. The channel assigned to the set top box 22 is specified to video demodulator 147 by an input received from the output of D/A converter 148. D/A converter 148 receives and converts to analog a value stored in register 149, which is set by the microcontroller 141 via I/O bus 142.

Audio demodulator 151 has its input coupled to coaxial bus 143 and demodulates audio signals received from the cable TV converter box via input 66. Demodulator 151 outputs the demodulated audio to one input of multiplexer 154 of the audio/video switch 126. Audio demodulator 152 has its input coupled to the output of video channel demodulator 147. Audio demodulator 152 outputs demodulated audio to another input of multiplexer 154.

The audio/video switch 126 includes multiplexers 153 and 154, voltage-controlled video channel modulator 155, and D/A converter 156. Multiplexer 153 receives a first of three inputs from the optional video input to the set top box 22, a second input directly from the coaxial cable bus 143, and a third input from the output of video channel demodulator 147. Multiplexer 153 outputs a selected one of its inputs to video channel modulator 155 based on the value stored in a register 166, which is set by microcontroller 141 via I/O bus 142. The input of multiplexer 153 from coaxial bus 143 allows selection of standard cable TV signals from a cable converter box or antenna to be displayed on the connected TV 23. Thus, multiplexer 153 enables selection between video received from the optional video input (e.g., from a camera), standard cable TV signals, or video data received on the channel assigned to the set top box 22. The output of video modulator 155 is provided to the connected TV 23 via coaxial cable on channel three or channel four. The output of register 166 is converted to an analog signal by D/A converter 156.

As noted above, multiplexer receives two of its three inputs from audio demodulators 151 and 152, respectively, and a third input from the optional external audio input. Multiplexer 154 outputs the selected one of its three inputs as an external RCA output, which may be connected to a conventional stereo tuner/amplifier, as noted above. The input selection of multiplexer 154 is determined by the value stored in storage register 166.

Thus, display data received from the server 20 representing a desktop is demodulated by video demodulator 147. Cable TV signals from the cable converter box 51 are demodulated by video channel modulator 155 and audio demodulator 151. Network channel communication is performed by video demodulator 158 and video modulator 159 under the control of network controller 157. Optional audio or video data input to the set top box 22 is modulated and transmitted to the server 20 by A/V mixer 150, video modulator 144, or both.

IV. Programmable Channel Server

Refer again to FIG. 5, which illustrates a local area network having a bus topology. As described above, the network includes a programmable channel filter 62, which is coupled to the external coaxial cable TV input 64 of the home. The programmable channel filter 62 is a relatively simple device, which passes only specified channels onto the coaxial bus 65 and filters out all other channels, based on commands from the server 20. The present invention, however, also includes a more "intelligent" device, referred to herein as a "channel server", which can substitute for the programmable channel filter 62. As will be described, the channel server of the present invention permits centralized control of television viewing within the network, including control of which channels are viewed on which TV sets in the network and when those channels may be viewed.

The channel server is connected in the network in place of the programmable channel filter 62. That is, the channel server is connected between the coaxial cable TV input 64 of the home and the coaxial bus 65. Among other functions, the channel server filters cable TV signals entering the home. However, in contrast with the simple programmable channel filter 62, which filters only specified channels, the channel server of the present invention filters out all TV channels except those which are actually being viewed from a client system. Thus, if only five TVs are being watched, for example, then only five TV channels are transmitted onto the coaxial cable bus 65. All other channels are available for local network purposes. The channel server, therefore, increases the number of local network channels that are available for other purposes. The channel filter also prevents signals generated locally within the network from leaving the network.

Generally, the channel server includes a tuner for each simultaneous TV watcher. The channel server may be a stand-alone box with slots for a number of tuner circuit cards. Each tuner card decodes and delivers one channel to one television set via a corresponding set top box 22. When a user turns on a TV set, the corresponding set top box 22 signals the channel server of this fact. In response, the channel server dynamically assigns a tuner, and the set top box 22 may request that the tuner tune to a specific TV channel in response to a user's channel selection.

Hence, all tuning occurs at a central location (in the channel server), away from all of the TV sets. As a result, the channel server allows for centralized control of television viewing in the home. Centralized control provides a number of advantages, such as allowing parents to control the viewing of their children. For example, a parent can control what channels can be viewed on any particular television set in the network and when those channels can be viewed. The channel server can be programmed to require a user to enter a password before they could access a particular TV channel, to prevent certain specific programs from being watched at all, or to allow certain programs to be watched only in certain rooms. In addition, the channel server can allow a parent to observe what type of programs a child is watching. For example, the channel server may be programmed to output a record of which channels have been watched from which TV sets for a particular period of time. This output could then be viewed on the display of the PC server 20 or printed out.

The user programs the channel server as desired over the network using software running on the PC server 20. Alternatively, a more sophisticated embodiment of the channel server may provide its own user interface to allow the input of programming directly into the channel server.

Figure 24:
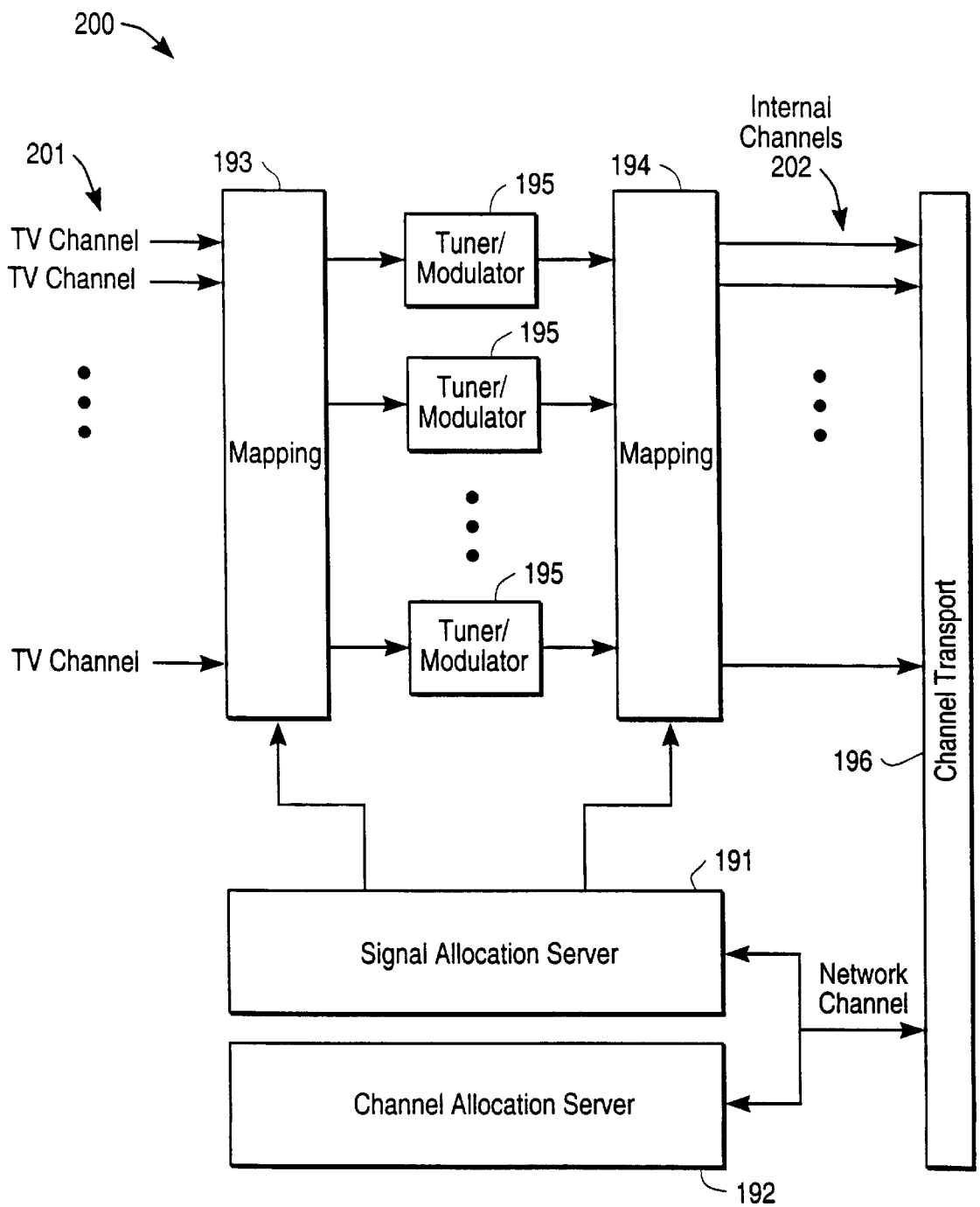
FIG. 24 is a functional block diagram of a channel server.

FIG. 24 illustrates a functional block diagram of a channel server 200 of the present invention. The channel server 200 includes mapping units 193 and 194, a number of tuner/modulator pairs 195, a signal allocation server (SAS) 191, a channel allocation server (CAS) 192, and portions of the network transport 196. Note that these components may be embodied in software, hardware, or various combinations of hardware and software. The SAS 191 and CAS 192 both use the network channel to communicate with the client systems via the channel transport 196 (i.e., over coaxial bus 65.). Mapping unit 193 receives as input a cable TV signal including a number of channels 200b, from the external coaxial connection 64. Mapping unit 193 maps particular TV channels 200b to individual tuner/modulator pairs 195 in response to signals from the SAS 191.

Each of the tuner/modulator pairs 195 is assigned to a particular client system. The exact number of tuner/modulators 195 within the channel server 200 is discretionary, but is at least equal to the maximum expected number of simultaneous TV viewers. Each of the tuner/modulators 195 outputs a demodulated cable TV signal on a particular channel to mapping unit 194. Mapping unit 194 maps each demodulated TV channel to an available internal network RF channel 202 and transmits the signal onto the channel transport 196 using the assigned internal channel. Operation of mapping unit 194 is also controlled by SAS 191. In certain cases, it may be desirable to map a TV channel onto a different internal channel 202 from the channel on which it was originally broadcast. Mapping unit 194 provides such capability, under the control of the SAS 191 and CAS 192.

The CAS 192 assigns, to each client system that requests a TV channel, a 6 MHz wide internal RF channel 202 for transmission of the requested TV channel onto the network. In addition, the CAS 192 maintains a channel allocation table that indicates the ID of each active client system and the channel assigned to each such system. Thus, it will be recognized that such functionality duplicates functions of the CAS 115 in the PC server 20 (see FIG. 15). Channel assignments can be made by either the channel server (using CAS 192) or the PC server 20 (using CAS 115). Only one CAS is required for the network, however. Channel assignments made by the PC server 20 can be communicated to the channel server over the coaxial bus 65 using the network channel While operation of the CAS 192 in the channel server is substantially the same as that of the CAS 115 in the PC server 20, the CAS 192 of the channel server does not require the capability to assign transmit channels. All channels assigned by the CAS 192 are receive channels. As described above, transmit channels are used for transmission of video and/or audio data from a client system to the PC server 20, for purposes such as video conferencing, recording television or audio signals, etc.

The SAS 191 controls the mapping performed by mapping units 193 and 194 to provide requested cable TV channels to individual client systems. The SAS 191 receives as input a requested TV channel via the network channel and the assigned internal RF channel from a client system. The SAS 191 uses this input to control mapping units 193 and 194. The SAS 191 maintains a table specifying which incoming TV channel has been mapped to each tuner/modulator.

Figure 25:
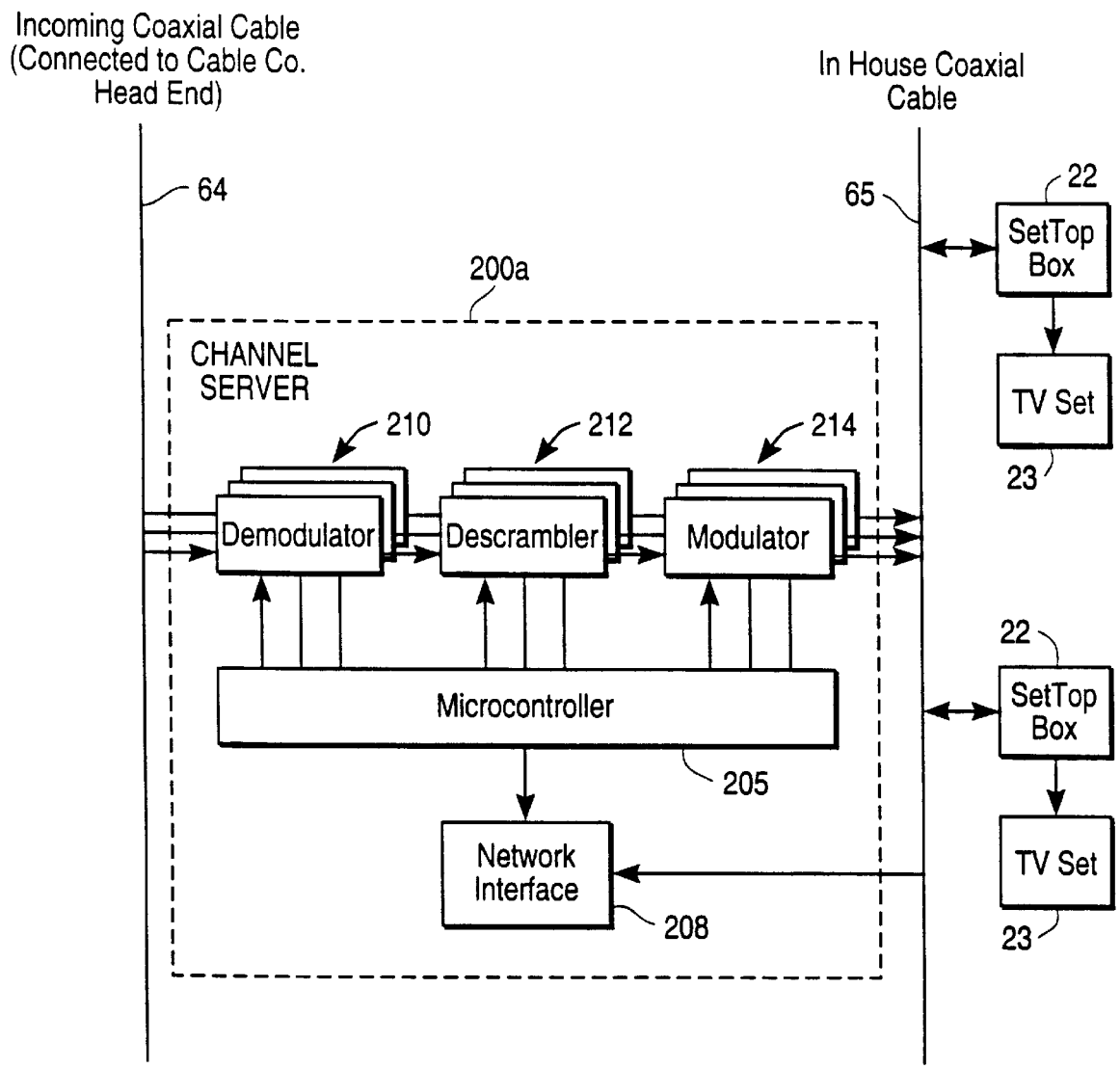
FIG. 25 is a block diagram of a channel server according to a first embodiment.

FIG. 25 shows a block diagram of the hardware of the channel server, according to one embodiment. In the illustrated embodiment, the channel server 200a includes a microcontroller 205, a network interface 208, demodulators 210, descramblers 212, and modulators 214. Demodulators 210 receive input cable TV signals via the external coaxial connection 64. As noted above, the channel server includes a tuner/modulator for each simultaneous TV user. In the illustrated embodiment, each tuner includes a demodulator 210 and a descrambler 212. Each descrambler 212 performs any required signal descrambling, which would otherwise be performed within the cable converter box 51 of a given client system. Accordingly, there is no need for separate cable converter boxes in this embodiment.

The output of each demodulator 210 is provided to a corresponding descrambler 212. The output of each descrambler 212 is provided to a corresponding modulator 214, which rebroadcasts the descrambled TV channel onto the coaxial bus 65 on the assigned internal RF channel. The channel output by each of the modulators 214 is also controlled by the microcontroller 205.

The microcontroller 205 is programmed appropriately to control the demodulators 210, descramblers 212 and modulators 214 (i.e., to perform the functions of SAS 191, CAS 192, and mapping units 193 and 194). That is, the microcontroller 205 determines the particular channel demodulated by each of the demodulators 210 and the modulation channel of each modulator 214. The microcontroller 205 is coupled to the coaxial bus 65 via a network interface 208, which enables the channel server to communicate on the network channel as described above FIG. 26 illustrates the hardware of a channel server for a second embodiment, according to which separate cable converter boxes 51 are included in the network, and any required signal descrambling is performed by those boxes. In response to user's channel selection, each set top box 22 controls the channel to which the corresponding cable converter box 51 is tuned using an infrared link 46. Also in response to the user's channel selection, the set top box 22 transmits a signal to the channel server 200b via the coaxial bus 65, indicating the TV channel the viewer wishes to watch. In response, the channel server 200b demodulates the requested TV channel and rebroadcasts it onto the coaxial bus 65.

Figure 26:
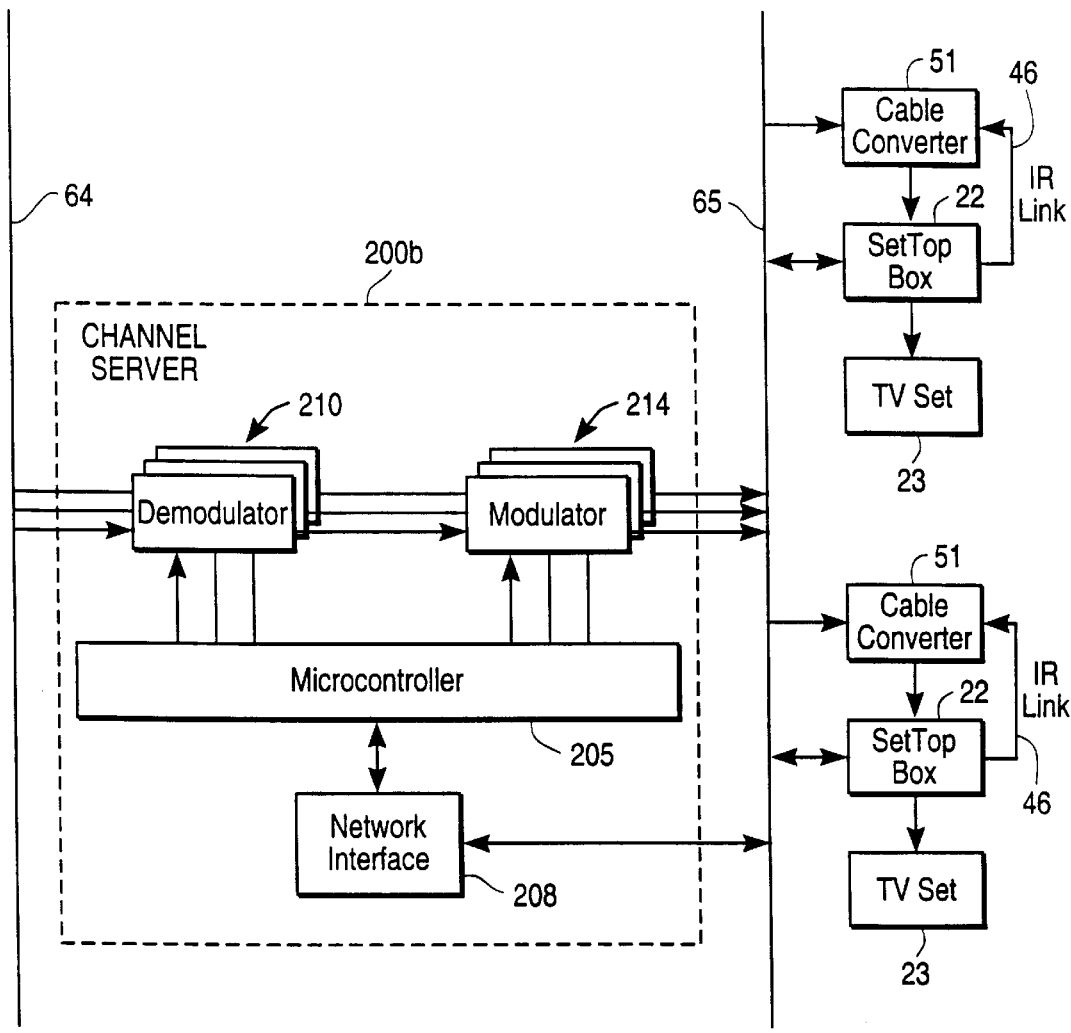
FIG. 26 is a block diagram of a channel server according to a second embodiment.

The channel server 200b of FIG. 26 includes no descramblers, because descrambling is performed in the cable converter boxes 51. Accordingly, the channel server 200b includes a microcontroller 205, network interface 208, demodulators 210 and modulators 214, as described above; however, the output of each demodulators 210 is provided directly to the corresponding modulator 214, rather than to a descrambler.

The cooperation between the channel server and the set top boxes 22 is as follows. When the TV set connected to the set top box 22 is first turned on, the set top box 22 transmits a channel allocation request and a signal allocation request onto the coaxial bus 65. The signal allocation request specifies a particular TV channel, which may be the last channel to which the TV set was tuned prior to being turned off, or a default channel. The channel server rebroadcasts the requested TV channel onto the coaxial bus 65 on the assigned channel. In an embodiment which does not use separate cable converter boxes (see FIG. 25), the channel server may assign the requested TV channel to a different internal RF channel (i.e., remap the requested channel to a different 6 MHz wide set of frequencies). In that case, the channel server transmits the channel assignment onto the coaxial bus 65. In response to receiving the channel assignment, the set top box 22 configures itself to demodulate the TV signals on the assigned internal channel. When the viewer requests a channel change, the set top box 22 transmits a new signal allocation request to the channel server, specifying a new channel. The channel server responds by adjusting the channel of the tuner assigned to that client system.

V. Computer Monitor Compatibility

Figure 27:
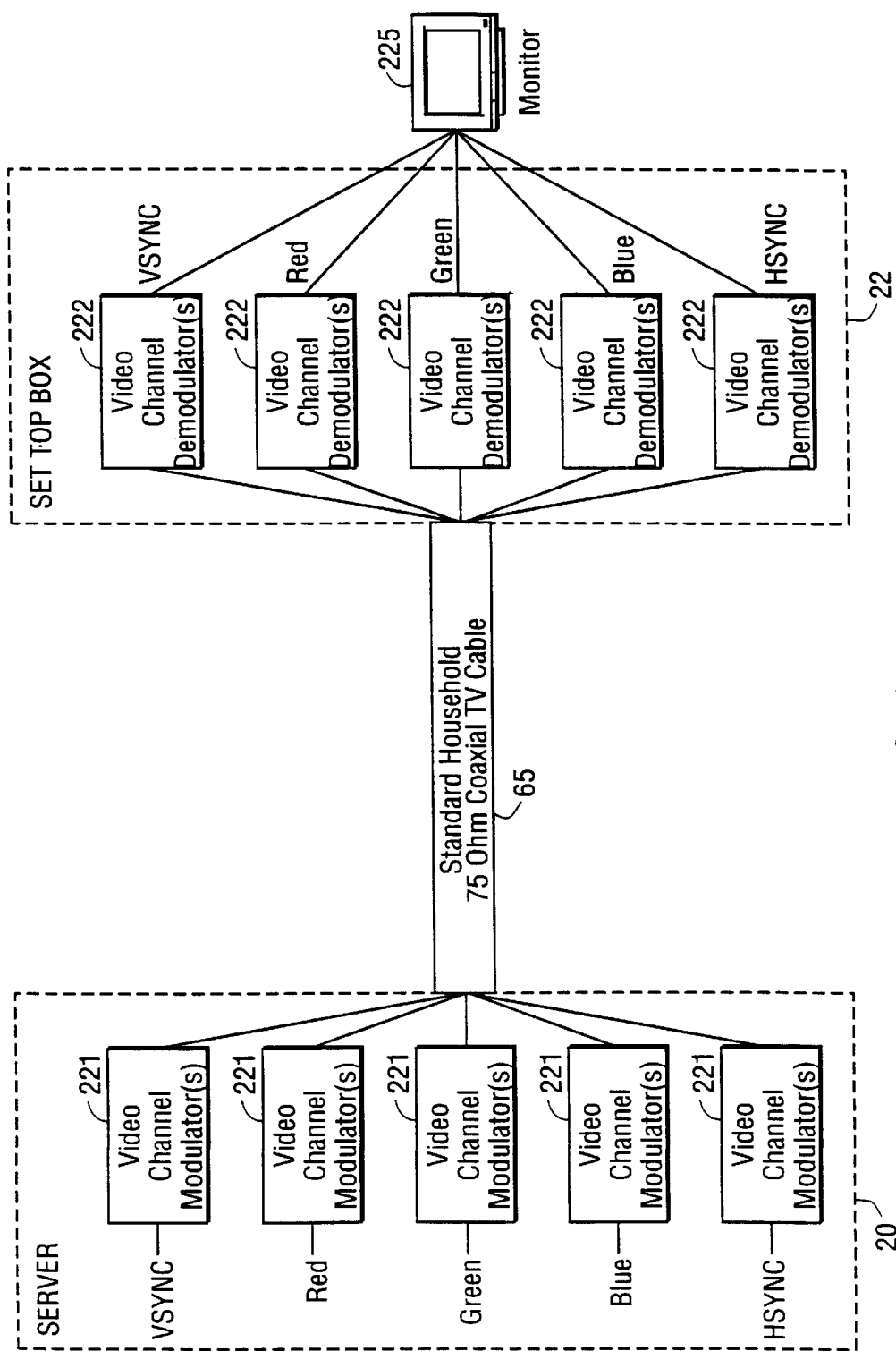
FIG. 27 illustrates a technique for transmitting display data from a server to a remote RGB monitor over a coaxial cable.

It may be sometimes be desirable to connect a standard computer monitor, such as an Enhanced Graphics Array (EGA), Video Graphics Array (VGA) or Super VGA (SVGA) monitor, to the network as a display device. Accordingly, the present invention provides a technique by which this can be accomplished. Specifically, the present invention enables one to connect to the network a display device designed to receive multiple individual signals as input, such as red, green, and blue (RGB) signals, etc., in contrast with a conventional TV which receives a single NTSC (or other similar) input signal. This technique is illustrated in FIG. 27.

Assume that one now wishes to connect a conventional RGB computer monitor 225 to the network shown in FIG. 5, in place of one of the television sets 23. The monitor is responsive to separate red (R), green (G), and blue (B) color signals, as well as a vertical synchronization signal VSYNC and a horizontal synchronization signal HSYNC. In accordance with the present invention, each of these separate signals is assigned to, and modulated onto, one or more separate RF channels, from which other content has been filtered (i.e., by channel filter 62 or channel server 200). The modulated signals are then transmitted together onto the coaxial bus 65. Hence, for each of the R, G, B, VSYNC, and HSYNC signals, the PC server 20 includes one or more dedicated video channel modulators 221 for modulating these onto the network's coaxial cable bus 65.

In general, the channels assigned for the monitor signals are standard 6 MHz wide television channels at standard cable TV frequencies. Note that while FIG. 27 indicates the HSYNC and VSYNC signals are modulated onto separate channels, these two signals have low enough frequencies that they may both be modulated onto a single channel, if desired. Thus, multiple channels are used for the RGB monitor, rather than the single desktop channel that is employed when a conventional television set is used as a display device. Because this technique requires several available RF channels for each monitor, it may be desirable to increase the number of channels available in the network for this purpose. Therefore, it may be beneficial to employ, in conjunction with this technique, an intelligent channel server, such as described above in relation to FIGS. 24 through 26.

The combined, modulated signals are then separately demodulated within a set top box 22, as shown, or alternatively within the monitor 225, and then used by the monitor to generate a display. Hence, for each of the multiple input signals, the set top box 22 (or monitor 225) includes one or more dedicated video channel demodulators 222 to demodulate that signal.

For certain types of display devices, one 6 MHz wide RF channel may be sufficient for each input signal, such as where the display device requires data at a relatively low frequency. However, for other types of display devices which require higher frequency data, such as VGA or SVGA monitors, one channel may not provide sufficient bandwidth for certain input signals. For such devices, therefore, input signals can be distributed between multiple RF channels (and, therefore, multiple modulator/demodulator pairs). Assume, for example, that the display rate of the monitor is too high to allow the R, G, and B color signals to be accommodated by one RF channel each. Consequently, two or more channels are assigned for each color signal. More specifically, pixels of a given color signal are essentially time division multiplexed between two or more RF channels, such as all odd pixels onto a first channel and all even pixels onto a second channel. The HSYNC signal is used for synchronization of the two channels at the receiving; i.e., HSYNC indicates that the next pixel to be received is the first pixel of a scan line, indicating which of the two channels should be selected. It will be recognized that additional channels can be used for each signal, as required.

Thus, a technique has been described for controlling television signal distribution to multiple client systems in a home network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A device for providing television signals to a plurality of viewing systems on a network, the device comprising:
   a connection to receive a plurality of television channels from outside the network;
   a plurality of tuners, a different tuner assigned to each of the viewing systems;
   a plurality of modulators; and
   control circuitry configured to receive a request for one of the plurality of television channels, the request associated with one of the viewing systems, and to respond to the request by causing the tuner assigned to said one of the viewing systems to demodulate the requested television channel and by causing one of the modulators to remodulate the demodulated television channel onto one of a plurality of network RF channels, the control circuitry including
   a first mapping unit to assign one of the television channels to one of the tuners and one of the modulators, and
   a second mapping unit to map an output of said one of the modulators to said one of the network RF channels.

2. A device according to claim 1, wherein the controller is further configured to assign each of the viewing systems a different radio frequency (RF) channel for communication of television signals to the viewing systems on the network.

3. A device according to claim 1, wherein the controller further configured to remodulate the requested television channel onto a different channel for transmission onto the network.

4. A device according to claim 1, wherein the device is configured to prevent television channels not requested by any of the viewing systems from entering the network.

5. A device according to claim 1, wherein the control circuitry is further configured to receive user inputs for programming the device to control access by each of the viewing systems to the television channels.

6. A device according to claim 5, wherein the user inputs comprise inputs specifying a television channel that is prohibited for one of the viewing systems.

7. A device according to claim 6, wherein the control circuitry is further configured to respond to a request for a television channel by denying the request if the requested television channel is prohibited for a viewing system associated with the request.

8. A server for providing television signals to a plurality of client systems on a local network, the device comprising:
   a connection to receive a plurality of television channels from outside the local network;
   a plurality of tuners to demodulate television channels;
   a plurality of modulators to modulate television channels;
   a controller configured to receive a request for one of the television channels from one of the client systems and to respond to the request by causing a corresponding one of the tuners to demodulate the requested television channel and by causing a corresponding one of the modulators to remodulate the demodulated television channel onto the local network, the controller including
   a first mapping unit to assign the requested one of the television channels to said corresponding one of the tuners and said corresponding one of the modulators, and
   a second mapping unit to map an output of said corresponding one of the modulators to one of a plurality of channels on the local network.

9. A server according to claim 8, wherein the controller is further configured to cause the modulator to remodulate the demodulated television channel using a channel assigned only to the requesting client system.

10. A server according to claim 8, wherein the controller is further configured to assign each of the client systems to a different one of the plurality of channels on the local network.

11. A server according to claim 8, wherein the server is configured to prevent all television channels except television channels requested by the client systems from entering the network.

12. A server according to claim 8, wherein each of the tuners is assigned to a different one of the client systems.

13. A server according to claim 10, wherein the client systems and the channel server are connected in the network via a shared radio frequency (RF) transmission medium.

14. A server according to claim 8, the controller further configured to receive user inputs for programming the server.

15. A server according to claim 14, wherein the user inputs specify which television channels may be provided to a specified one of the client systems.

16. A server according to claim 15, the controller further for responding to a request for a television channel by denying the request if the user inputs indicated that said one of the television channels is a prohibited channel.

17. A channel server for providing a plurality of television channels to a plurality of client systems in a local area network, the channel server comprising:

a plurality of tuners coupled to receive the plurality of television channels from outside the network;

a plurality of modulators, each of the modulators receiving an output of one of the tuners;

a controller to control the tuners and the modulators, the controller configured to receive a request for a television channel from one of the client systems in the network and, in response to the request, to cause one of the tuners to demodulate the requested television channel, and to cause the associated modulator to remodulate the requested television channel onto the network at an RF channel assigned to the client system, the controller including a first mapping unit to assign one of the television channels to one of the tuners and one of the modulators, and a second mapping unit to map an output of said associated modulator to said RF channel, wherein a different RF channel is assigned to each of the client systems.

18. A channel server according to claim 17, wherein the controller is further configured to assign each of the tuners to a different one of the client systems.

19. A channel server according to claim 17, the client systems and the channel server each connected in the network via a radio frequency (RF) transmission medium.

20. A channel server according to claim 17, the controller further configured to remodulate the requested television channel onto the network at a different frequency.

21. A channel server according to claim 17, the controller further configured to receive user inputs for programming the channel server.

22. A channel server according to claim 21, wherein the user inputs specify which television channels may be provided to a specified one of the client systems.

23. A channel server according to claim 22, the controller further for responding to a request for a television channel by denying the request if the user inputs indicated that said one of the television channels is a prohibited channel.

24. A channel server for receiving a plurality of television channels and for providing the television channels to a plurality of client systems on a local area network, the channel server comprising:

a plurality of television tuners;

a plurality of modulators, each of the modulators coupled to receive an output of one of the tuners;

a channel allocation unit to assign one of a plurality of network radio frequency (RF) channels to one of the client systems in response to a channel assignment request;

a first mapping unit to assign one of the television channels to one of the tuners and one of the modulators;

a second mapping unit to map an output of said one of the modulators to said one of the network RF channels;

a signal allocation unit to assign one of the television channels to one of the tuners in response to a request from one of the client systems for one of the television channels, the signal allocation unit further to control the first and second mapping units; and a communication interface to transmit the output of said one of the modulators onto the local area network the on the assigned one of the network RF channels.

25. A method of providing television signals to a local area network, the local area network having a plurality of client systems, the method comprising:

assigning each of a plurality of tuners to a different one of the client systems;

assigning each of a plurality of modulators to a different one of the client systems;

receiving a plurality of television channels from outside the network;

receiving a request for one of the television channels from one of the client systems;

mapping the requested television channel to one of the tuners and one of the modulators assigned to said one of the client systems, and in response to the request, using the tuner assigned to said one of the client systems to tune to the requested television channel;

mapping an output of the modulator assigned to the client system to one of a plurality of network RF channels, the output representing the requested television channel; and transmitting a signal representing the requested television channel to said one of the client systems on said one of the network RF channels over the local area network using the modulator assigned to said one of the client systems.

26. A method according to claim 25, further comprising descrambling the requested television channel prior to transmitting the television channel onto the network.

27. A method according to claim 25, further comprising mapping the requested television channel onto a different channel, wherein said transmitting the requested channel onto the network comprises modulating the requested channel onto the different channel for transmission onto the network.

28. A method according to claim 25, further comprising:

receiving user input specifying which of the plurality of television channels may be provided to said one of the client systems; and referencing the requested channel against the user inputs, wherein transmitting the requested channel onto the network comprises transmitting the requested channel onto the network only if the user inputs indicate that said one of the client systems may access the requested channel.

* * * * *